United States Patent
Nam et al.

(10) Patent No.: US 11,055,020 B2
(45) Date of Patent: Jul. 6, 2021

(54) DATA STORAGE DEVICE SHARING OPERATIONS WITH ANOTHER DATA STORAGE DEVICE AND METHOD OF OPERATING THE SAME

(71) Applicant: SK hynix Inc., Gyeonggi-do (KR)

(72) Inventors: Yun Seung Nam, Gyeonggi-do (KR); Jung Park, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 50 days.

(21) Appl. No.: 16/548,234

(22) Filed: Aug. 22, 2019

(65) Prior Publication Data

US 2020/0201563 A1 Jun. 25, 2020

(30) Foreign Application Priority Data

Dec. 19, 2018 (KR) .......................... 10-2018-0165696

(51) Int. Cl.
G06F 3/06 (2006.01)

(52) U.S. Cl.
CPC .......... *G06F 3/0658* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 6,073,218 A * | 6/2000 | DeKoning | ................ | G06F 9/52 710/20 |
| 6,343,324 B1 * | 1/2002 | Hubis | .................. | G06F 3/0622 709/229 |
| 2010/0036998 A1 * | 2/2010 | Ben-Rubi | ............ | G06F 3/0625 711/100 |
| 2014/0189212 A1 * | 7/2014 | Slaight | ................. | G06F 3/0619 711/103 |
| 2015/0331765 A1 * | 11/2015 | Madhusudana | ..... | G06F 11/2058 714/5.11 |

FOREIGN PATENT DOCUMENTS

| KR | 10-2011-0051209 | 5/2011 |
|---|---|---|
| KR | 10-2017-0084537 | 7/2017 |

* cited by examiner

*Primary Examiner* — Edward J Dudek, Jr.
*Assistant Examiner* — Ralph A Verderamo, III
(74) *Attorney, Agent, or Firm* — IP & T Group LLP

(57) ABSTRACT

A data storage device includes a memory device configured to store data; and a memory controller configured to control the memory device in response to a request of the host. The memory controller may include: a device information storage configured to store device information including share function information indicating whether the storage device is capable of sharing the data with another storage device and a monitor configured to receive from the host an initialization message determining, based on the share function information, a kind of information output from the storage device, and generate any one of normal status information and extended status information indicative of a current status of the storage device, in response to the initialization message.

16 Claims, 16 Drawing Sheets

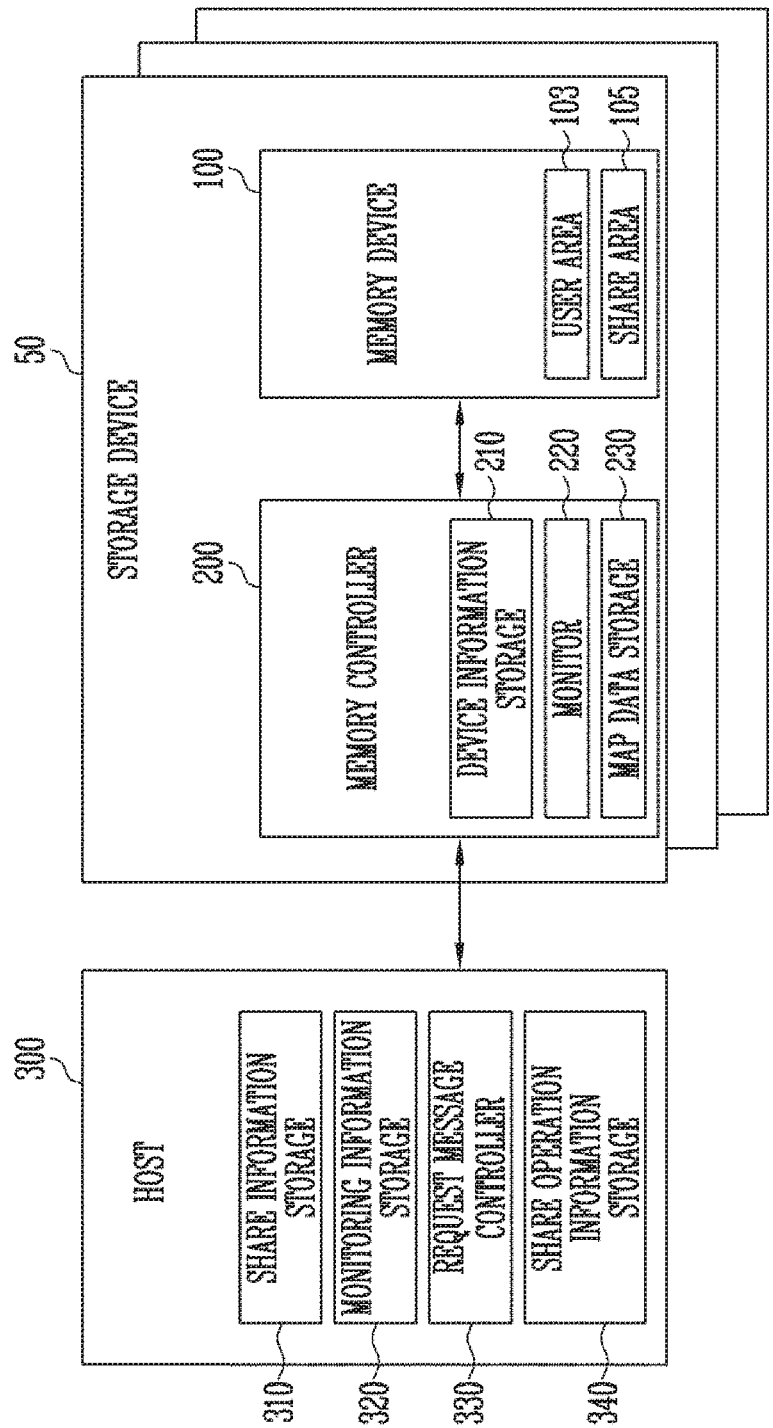

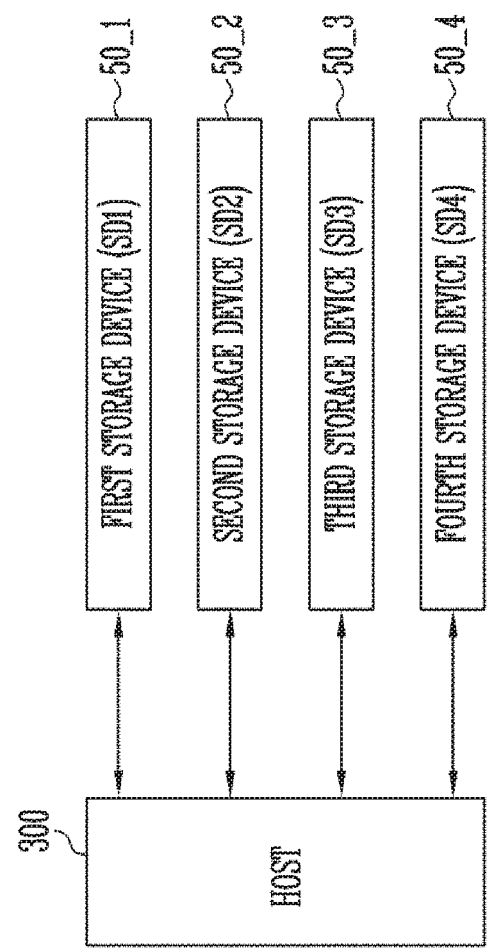

| STORAGE DEVICE (SD) | DEVICE INFORMATION (DI) |
|---|---|
| FIRST STORAGE DEVICE (SD1) | 1 |
| SECOND STORAGE DEVICE (SD2) | 1 |
| THIRD STORAGE DEVICE (SD3) | 0 |
| FOURTH STORAGE DEVICE (SD4) | 0 |

| STORAGE DEVICE (SD) | SHARE INFORMATION (SI) |
|---|---|
| FIRST STORAGE DEVICE (SD1) | O |
| SECOND STORAGE DEVICE (SD2) | O |
| THIRD STORAGE DEVICE (SD3) | X |
| FOURTH STORAGE DEVICE (SD4) | X |

| STATUS | STATUS DATA (STA_DATA) |
|---|---|
| READY STATUS (Ready) | 0 |
| BUSY STATUS (Busy) | 1 |
| HIGH TEMPERATURE STATUS (Need to cool down) | 2 |
| DATA BACK-UP REQUIRED STATUS (Need to back-up data) | 3 |
| RECOVERY REQUIRED STATUS (Need to recovery) | 4 |
| FAILURE ANALYSIS DATA BACK-UP REQUIRED STATUS (Need to back-up FA data) | 5 |

| STATUS | STATUS DATA (STA_DATA) |
|---|---|
| READY STATUS (Ready) | 0 |
| BUSY STATUS (Busy) | 1 |

| STORAGE DEVICE (SD) | STATUS | STATUS DATA (STA_DATA) |
|---|---|---|
| FIRST STORAGE DEVICE (SD1) | DATA BACK-UP REQUIRED STATUS (Need to back-up data) | 3 |
| SECOND STORAGE DEVICE (SD2) | READY STATUS (Ready) | 0 |

DATA STORAGE DEVICE SHARING OPERATIONS WITH ANOTHER DATA STORAGE DEVICE AND METHOD OF OPERATING THE SAME

CROSS-REFERENCE TO RELATED APPLICATION

The present application claims priority under 35 U.S.C. § 119(a) to Korean patent application number 10-2018-0165696, filed on Dec. 19, 2018, the entire disclosure of which is incorporated herein by reference in its entirety.

BACKGROUND

Field of Invention

Various embodiments of the present disclosure generally relate to an electronic device, and more particularly, to a data storage device and a method of operating the data storage device.

Description of Related Art

Generally, a data storage device stores data under control of a host device such as a computer, a smartphone, or a smartpad. The storage device may include a memory device configured to store data, and a memory controller configured to control the memory device. Such memory devices are classified into volatile memory devices and nonvolatile memory devices.

In a volatile memory device, stored data is lost when power is interrupted. Representative examples of a volatile memory device include a static RAM (SRAM), a dynamic RAM (DRAM), and a synchronous DRAM (SDRAM).

A nonvolatile memory device retains stored data even when power is interrupted. Representative examples of a nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (ReRAM), and a ferroelectric RAM (FRAM).

SUMMARY

Various embodiments of the present disclosure are directed to a data storage device including a memory device and a memory controller configured to control the memory device such that a share operation may be performed between data storage devices, and a method of operating the data storage device.

An embodiment of the present disclosure may provide for a data storage device including: a memory device configured to store data; and a memory controller configured to control the memory device in response to a request of the host. The memory controller may include: a device information storage configured to store device information including share function information indicating whether the storage device is capable of sharing the data with another storage device and a monitor configured to receive from the host an initialization message determining, based on the share function information, a kind of information output from the storage device, and generate any one of normal status information and extended status information indicative of a current status of the storage device, in response to the initialization message.

An embodiment of the present disclosure may provide for a method of operating a data storage device including a memory device configured to store data, and a memory controller configured to control the memory device in response to a request of a host, the method including: storing device information including share function information indicating whether the storage device is capable of sharing the data with another storage device, receiving an initialization message from the host based on the device information and generating any one of normal status information and extended status information indicative of a current status of the storage device based on the initialization message.

An embodiment of the present disclosure may provide for a host device including: a share information storage configured to receive and store device information from each of a plurality of storage devices indicating whether the corresponding storage device is able to perform a share operation of sharing data with at least one other of the plurality of storage devices, a monitoring information storage configured to receive and store monitoring information indicative of a current status of each of the plurality of storage devices and a request message controller configured to generate and output a request message for performing a normal operation or the share operation of at least two of the plurality of storage devices, based on the device information received from the plurality of storage devices.

An embodiment of the present disclosure may provide for a method of operating a host device, including: receiving, from each of a plurality of storage devices, device information indicating whether the corresponding storage device is capable of performing a share operation of sharing data with another storage device, storing the device information, receiving monitoring information indicating a current status of each of the plurality of storage devices, storing the monitoring information and generating and outputting a request message for performing a normal operation or the share operation of at least two of the plurality of storage devices, based on the device information received from the plurality of storage devices.

An embodiment of the present disclosure may provide for a data processing system including: a plurality of storage devices each configured to store share function information and a host configured to select, based on the share function information, first and second cooperative storage devices among the storage devices, control, when the first cooperative storage device is in a non-ready status, the second cooperative storage device in the ready status to perform a sharable operation, which the first cooperative storage device is supposed to perform and control, when the first cooperative storage device is in the ready status, the second cooperative storage device to provide the first cooperative storage device with a result of the sharable operation performed by the second cooperative storage device, wherein the share function information indicates whether or not a corresponding storage device is capable of performing the sharable operation on behalf of a cooperative storage device.

BRIEF DESCRIPTION OF THE DRAWINGS

FIG. 1 is a block diagram illustrating a storage device in accordance with an embodiment of the present disclosure.

FIG. 2 is a diagram illustrating a plurality of storage devices coupled with a host in accordance with an embodiment of the present disclosure.

FIGS. 3A and 3B are diagrams respectively illustrating device information stored in a device information storage, such as that of FIG. 1 and share information stored in a share information storage, such as that of FIG. 1.

FIGS. 6A and 6B are diagrams illustrating a status information table, such as that of FIG. 5.

FIG. 7 is a diagram illustrating monitoring information stored in a monitoring information storage, such as that of FIG. 1.

DETAILED DESCRIPTION

Figure 4:
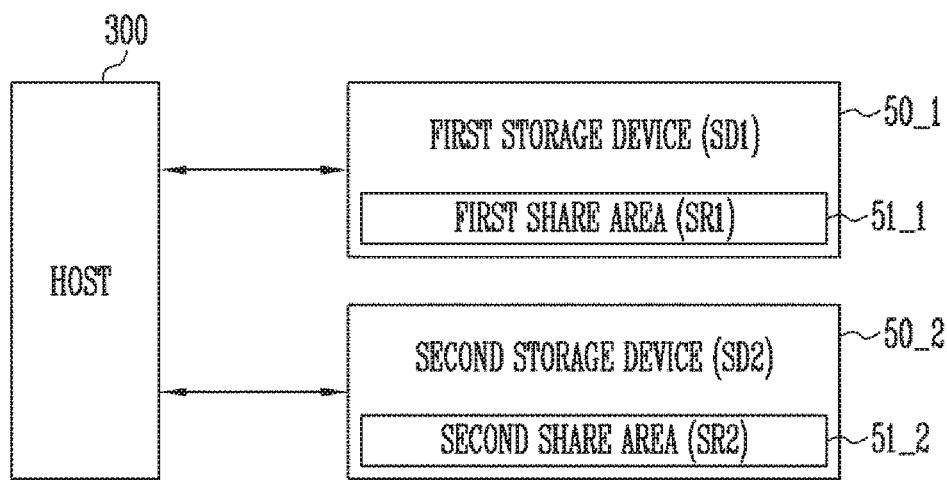
FIG. 4 is a diagram illustrating share areas in respective storage devices in accordance with an embodiment of the present disclosure.

Specific structural and functional description presented herein is direct to embodiments of the present disclosure. The present invention, however, is not limited to either the specific description provided or any of the embodiments described herein.

While various embodiments are described in detail, the present invention is not limited to the embodiments set forth herein. Rather, the present invention covers not only the disclosed embodiments, but also various alternatives, modifications, and equivalents thereof, as well as other embodiments, that fall within the spirit and scope of the present disclosure.

It will be understood that, although the terms "first", "second", etc. may be used herein to identify various elements, these elements should not be limited by these terms. These terms are only used to distinguish one element from another element that otherwise have the same or similar names. For example, a first element in one instance could be termed a second element in another instance without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms and vice versa, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art is omitted to avoid obscuring the subject matter of the present disclosure. This aims to make the subject matter of the present disclosure clear.

Various embodiments of the present disclosure are described more fully below with reference to the accompanying drawings, in which preferred embodiments of the present disclosure are shown, so that those skilled in the art are able to practice the invention. Throughout the specification, reference to "an embodiment," "another embodiment" or the like is not necessarily to only one embodiment, and different references to any such phrase are not necessarily to the same embodiment(s).

FIG. 1 is a block diagram illustrating a storage device 50 in accordance with an embodiment of the present disclosure.

Referring to FIG. 1, the storage device 50 may include a memory device 100 and a memory controller 200.

The storage device 50 may be a device configured to store data under control of a host 300 such as a cellular phone, a smartphone, an MP3 player, a laptop computer, a desktop computer, a game machine, a TV, a tablet PC, or an in-vehicle infotainment system.

The storage device 50 may be configured as any of various kinds of storage devices depending on a host interface, which is a communication system with the host 300. For example, the storage device 50 may be implemented as any of an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) type storage device, a compact flash (CF) card, a smart media card, and a memory stick.

The storage device 50 may be manufactured in the form of any of various package types. For instance, the storage device 50 may be manufactured as a package on package (POP) type, a system in package (SIP) type, a system on chip (SOC) type, a multi-chip package (MCP) type, a chip on board (COB) type, a wafer-level fabricated package (WFP) type, or a wafer-level stack package (WSP) type.

The memory device 100 may store data therein. The memory device 100 may operate under control of the memory controller 200. The memory device 100 may include a memory cell array including a plurality of memory cells configured to store data therein. The memory cell array may include a plurality of planes. Each plane may include a plurality of memory blocks BLK1 to BLKz. Each memory block may include a plurality of memory cells. Each memory block may include a plurality of pages. In an embodiment, each page may be the unit of storing data in the memory device 100 or reading stored data from the memory device 100. Each memory block may be the unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, aspects and features of the invention are described in the context in which the memory device 100 is a NAND flash memory.

In an embodiment, the memory device 100 may be embodied in a three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

In an embodiment, each of the memory cells included in the memory device 100 may be formed of a single-level cell (SLC) capable of storing one data bit. Alternatively, each of the memory cells included in the memory device 100 may be formed of a multi-level cell (MLC) capable of storing two data bits, a triple-level cell (TLC) capable of storing three data bits, or a quad-level cell (QLC) capable of storing four data bits.

The memory device 100 may receive a command and an address from the memory controller 200 and access an area of the memory cell array that is selected by the address. In other words, the memory device 100 may perform an operation corresponding to the command on the region selected by the address. For example, the memory device 100 may perform a write (program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

The memory device 100 may perform a program operation or an erase operation using a set operating voltage under control of the memory controller 200.

The memory device 100 may include a user area 103 and a share area 105.

In an embodiment, the user area 103 may be configured to store data provided from the host 300 or an external system. The user area 103 may be where a normal operation corresponding to a request message REQ_MSG of the host 300 is performed. The normal operation may be a program (write) operation, a read operation, or an erase operation which is performed without a share operation with another storage device. The share operation may be an operation of sharing, by the storage device, data with another storage device.

In an embodiment, share area 105 in the memory device 100 may be configured to allow the storage device 50 to perform a share operation with another storage device. The storage device 50 may include an area for performing a share operation with another storage device. The share operation may include a series of operations of performing, by the storage device 50, an operation to be performed on another storage device, or performing, by another storage device, an operation to be performed by the storage device 50.

In detail, the operation to be performed on another storage device may be performed in the share area 105 in the storage device 50. To perform the operation to be performed on another storage device, the storage device 50 may receive a request message REQ_MSG and data from the host 300. In other words, the storage device 50 may receive the request message REQ_MSG and the data so that an operation corresponding to the request message REQ_MSG may be performed in the share area 105. The operation corresponding to the request message REQ_MSG of the host 300 may be a program (write) operation.

To perform, by another storage device, the operation to be performed by the storage device 50, the storage device 50 may provide data to the host 300. Hence, the storage device 50 may receive the request message REQ_MSG from the host 300 and output the stored data to the share area 105 in the storage device 50. The operation corresponding to the request message REQ_MSG of the host 300 may be a read operation.

Consequently, a normal operation of the storage device may be performed in the user area 103 in the memory device 100, and a share operation between the storage devices may be performed in the share area 105 in the memory device 100.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address from the host 300, and translate the logical block address into a physical block address PBA indicating addresses of memory cells to which data is to be stored, the memory cells being included in the memory device 100. The memory controller 200 may store, in a buffer memory, a logical-physical address mapping table indicating mapping relationship between logical block addresses LBA and physical block addresses PBA.

The memory controller 200 may control the memory device 100 to perform a program operation, a read operation, or an erase operation in response to a request provided from the host 300. During a program operation, the memory controller 200 may provide a program command, a PBA, and data to the memory device 100. During a read operation, the memory controller 200 may provide a read command and a PBA to the memory device 100. During an erase operation, the memory controller 200 may provide an erase command and a PBA to the memory device 100.

In an embodiment, the memory controller 200 may autonomously generate a program command, an address and data without a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may include a device information storage 210 that may store device information DI of the storage device. The storage device 50 may be configured to store data, i.e., may be a data storage device. The device information DI may be information indicating whether the storage device 50 supports a share operation with another storage device, which may mean whether an operation to be performed by another storage device may be performed by the storage device 50 or whether an operation to be performed by the storage device 50 may be performed by another storage device.

The device information DI may include information indicating whether the storage device 50 may share data with another data storage device, which may be share function information. The share function information may include information about whether an operation of receiving a request message and data from the host 300 may be performed by one storage device, e.g., storage device 50 so as to perform an operation that would otherwise be performed on another data storage device. Furthermore, the share function information may include information about whether an operation of providing data to the host 300 may be performed by another data storage device on behalf of the storage device 50.

The device information DI may include an identification number identifying the storage device, manufacturer information, and information about whether a share operation may be supported. The device information DI may be stored in each storage device during manufacturing thereof. The share operation may be performed by storage devices selected based on the device information DI, which are capable of performing the share operation.

The device information DI may be provided to the host 300 during an initialization operation. The device information DI may be stored in each storage device. The device information DI stored in each storage device may vary in different storage devices. Storage devices having the same device information DI may perform a share operation. That is, when storage devices have same device information DI, one of storage devices having the same device information DI may perform an operation, which the others of storage devices having the same device information DI perform, in response to an equal host request.

In an embodiment, when storage devices capable of performing a share operation are selected based on the device information DI, the share area 105 for performing the share operation may be allocated to each storage device. The selected storage devices may perform the share operation through the share area 105.

A monitor 220 may store information about a current status of the storage device 50, which information may be monitoring information MNT_INF. The monitor 220 may output the stored monitoring information MNT_INF to the host 300 in response to a request of the host 300. The monitor 220 will be described in more detail with reference to FIG. 5.

The memory controller 200 may include a map data storage 230. The map data storage 230 may store map data based on a share operation which is performed between storage devices. In an embodiment, the map data storage 230 may store map data indicating a mapping relationship between a logical block address and a physical block address which are provided from the host 300. The physical block address may be an address indicating addresses of memory cells included in the share area of the storage device 50 which is allocated to perform the share operation of the host 300.

In an embodiment, the memory controller 200 may control two or more memory devices 100. In this case, the memory controller 200 may control the memory devices 100 in an interleaving manner so as to enhance the operating performance.

The host 300 may communicate with the storage device 50 using at least one of various communication methods, such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The host 300 may be coupled with a plurality of storage devices. Each of the plurality of storage devices may receive data from the host 300 or provide data to the host 300.

The host 300 may include a share information storage 310, a monitoring information storage 320, a request message controller 330, and a share operation information storage 340.

In an embodiment, the share information storage 310 may store share information SI, which may include information needed for the plurality of storage devices to perform a share operation. The share information SI may include information needed to classify the plurality of storage devices. The share information SI may be determined after having received device information DI from each of the plurality of storage devices. The device information DI may indicate whether the storage device 50 supports a share operation with another storage device. The share information SI may include information needed to determine which storage devices are capable of performing the share operation among the plurality of storage devices.

Hence, during an initialization operation, the host 300 may receive device information DI from each storage device 50 and generate share information SI. The share information SI may include information needed to determine storage devices capable of performing the share operation among the plurality of storage devices. The share information SI may be stored in the share information storage 310. During an initialization operation, if the host 300 determines that a share operation between storage devices may be performed based on the share information SI stored in the share information storage 310, the host 300 may provide an initialization message to the storage device 50 so as to perform the share operation.

The initialization message may be determined based on the share function information. The share function information may indicate whether the storage device may share data with another storage device. Furthermore, based on the initialization message received from the host 300, the kind of information to be output from the storage device may be determined. The kind of information may be either normal status information or extended status information, that is, information about a current status of the storage device.

In an embodiment, the monitoring information storage 320 may store monitoring information MNT_INF received from the memory controller 200. The monitoring information MNT_INF may include information about the current status of the storage device 50. The monitoring information storage 320 may store information about respective current statuses of the plurality of storage devices. The host 300 may determine whether a share operation may be performed, based on the information stored in the monitoring information storage 320. The share operation may be a series of operations that are supposed to be performed by another storage device but are instead performed by the storage device 50, or vice versa.

In an embodiment, the request message controller 330 may generate a request message REQ_MSG for performing a normal operation or a share operation. The request message controller 330 may provide the generated request message REQ_MSG to the storage device.

The normal operation may be a program (write) operation, a read operation, or an erase operation which is performed as a non-share operation. Therefore, the storage device 50 may perform a normal operation or a share operation based on the request message REQ_MSG received from the request message controller 330.

In an embodiment, if a share operation between storage devices is performed, the share operation information storage 340 may store information about the performed share operation. In detail, the share operation information storage 340 may store information about the request message REQ_MSG generated for the share operation. In addition, the share operation information storage 340 may store information about the storage device to which the request message REQ_MSG has been transmitted. In other words, the share operation information storage 340 may store device information DI of the storage devices on which the share operation has been, or is to be, performed.

FIG. 2 is a diagram illustrating a plurality of storage devices coupled with the host 300 in accordance with an embodiment of the present disclosure.

Referring to FIG. 2, each of the plurality of storage devices coupled to the host 300 may store data, i.e., may be a data storage device.

Although FIG. 2 illustrates that four (4) storage devices SD1 to SD4 (50_1 to 50_4) are coupled to the host 300, a greater number of storage devices may be coupled to the host 300.

In an embodiment, each of the first to fourth storage devices SD1 to SD4 may communicate with the host 300 without being affected by the other storage devices coupled to the host 300. In other words, the host 300 may provide a request message REQ_MSG to each storage device. Each storage device may perform an operation corresponding to the request message REQ_MSG without being affected by other storage devices.

Each of the first to fourth storage devices SD1 to SD4 may store device information DI, which may indicate whether the corresponding storage device supports a share operation with another storage device. Whether a storage device supports a share operation with another storage device may mean whether an operation to be performed by another storage device may be supported such that it is performed by the storage device having DI indicating that it supports a share operation.

In other words, the device information DI for a select storage device may include information indicating whether that storage device may share data with another data storage device, which information may be share function information. The share function information may include information about whether an operation of receiving a request message and data from the host 300 or an operation of providing data to the host 300 may be performed by one share-operation-supported storage device, which operation is supposed to be performed on another share-operation-supposed storage device.

Devices that store device information indicating shared operation capability among the first to fourth storage devices SD1 to SD4 may perform a share operation therebetween. In an embodiment, the share operation may include any of various operations supposed to be performed on one of the first to fourth storage devices SD1 to SD4 that is instead performed by another one of such storage devices.

FIGS. 3A and 3B are diagrams illustrating device information stored in the device information storage 210 of FIG. 1 and share information stored in the share information storage 310 of FIG. 1.

FIG. 3A illustrates the device information DI stored in the device information storage 210 in the memory controller 200. FIG. 3B illustrates the share information SI determined based on the device information DI. The share information SI may be stored in the share information storage 310 in the host 300.

In an embodiment, the device information storage 210 included in the memory controller 200 may store device information DI for each the plurality of storage devices. The device information DI may be information indicating whether the storage device 50 supports a share operation with another storage device. The device information DI may include an identification number for identifying the storage device, manufacturer information, and/or information about whether a share operation to be performed may be supported.

The device information DI may be provided to the host 300 during an initialization operation. The device information DI may be stored in each storage device. A portion of the device information DI, e.g., device identification, is specific to the storage device in which it is stored. Storage devices having the same information indicating shared support may perform a share operation.

The device information DI may have a data value, which may be a single bit value of '0' or '1', for indicating whether the storage device 50 may perform a share operation with another storage device.

In an embodiment, the device information DI stored in each of the first storage device SD1 and the second storage device SD2 may have a data value of '1'. The device information DI stored in each of the third storage device SD3 and the fourth storage device SD4 may have a data value of '0'.

If the device information DI of the storage device 50 has a data value other than '0', e.g., a data value of '1', the device information DI may represent that the storage device 50 may perform a share operation with another storage device and may also represent that at least two devices capable of performing a share operation are present among the plurality of storage devices. In other words, if the device information DI has a data value of '1', the storage device 50 may perform a share operation with another storage device that stores the same data value as part of its device information DI. Hence, since the device information DI stored in the first storage device SD1 and the second storage device SD2 both include the same data value of '1', the first storage device SD1 and the second storage device SD2 may perform the share operation therebetween.

If the device information DI of the storage device 50 has a data value of '0', the device information DI may represent that a share operation between the storage device 50 and another storage device is impossible. If the device information DI has a data value of '0', the device information DI may represent that devices capable of performing a share operation therebetween are not present among the plurality of storage devices. In other words, if the device information DI has a data value of '0', the storage device 50 may not perform a share operation with another storage device. Hence, the third storage device SD3 or the fourth storage device SD4 may not perform a share operation with another storage device.

In an embodiment, the share information storage 310 included in the host 300 may generate and store share information SI for performing a share operation. The share information SI may include information needed to classify the plurality of storage devices. The share information SI may be determined after having received the device information DI from each of the plurality of storage devices. In other words, during an initialization operation, the host 300 may receive the device information DI from each storage device 50 and then generate and store share information SI. The host 300 may provide an initialization message for performing a share operation between the storage devices to each such storage device, based on the stored share information SI.

FIG. 4 is a diagram illustrating share areas that are respectively included a plurality of storage devices in accordance with an embodiment of the present disclosure. In the illustrated embodiment, there are four (4) storage devices: 50_1, 50_2, 50_3 and 50_4. In the discussion below, storage device 50 or storage devices 50 may be used.

Referring to FIG. 4, the first storage device 50_1 and the second storage device 50_2 of FIG. 4 may perform a share operation therebetween. The first storage device 50_1 and the second storage device 50_2 may respectively include a first share area 51_1 (SR1) and a second share area 51_2 (SR2). Each share area may be separated from the user area 103. The user area 103 may be an area in which a normal operation corresponding to a request message REQ_MSG of the host 300 is performed. The normal operation may be a program (write) operation, a read operation, or an erase operation which is performed as a non-share operation. Hence, the user area 103 may be an area in which the normal operation is performed.

During an initialization operation, the host 300 may determine that the share operation between the storage devices may be performed, based on the device information DI received from each storage device. In detail, the host 300 may determine that the first storage device 50_1 and the second storage device 50_2 may perform the share operation therebetween. After the host 300 has determined that the storage devices 50_1 and 50_2 may perform the share operation, the host 300 may provide an initialization message to each of the first storage device 50_1 and the second storage device 50_2 to perform the share operation.

The initialization message may be determined based on the share function information of the two storage devices. The share function information may indicate whether the associated storage device may share data with the other storage device. Furthermore, based on the initialization message received from the host 300, the kind of information to be output from the storage device may be determined. The kind of information to be output from the storage device may be either normal status information or extended status information which is indicative of a current status of the storage device.

In an embodiment, during the initialization operation, if the host 300 determines that devices may perform a share operation therebetween, each storage device may allocate a share area for performing the share operation. The share operation may be one or more operations supposed to be performed by one of the two storage devices which is performed by the other of the two storage devices.

In an embodiment, since the first storage device 50_1 and the second storage device 50_2 may perform a share operation therebetween, the host 300 may allocate, during the initialization operation, the first share area 51_1 and the second share area 51_2 as areas for performing the share operation.

The storage devices capable of performing the share operation may perform the share operation through the share areas allocated the respective storage devices. Therefore, the first storage device 50_1 and the second storage device 50_2 may perform the share operation through the first share area 51_1 and the second share area 51_2.

In detail, the first storage device 50_1 and the second storage device 50_2 may respectively include the first share area 51_1 and the second share area 51_2 to perform the share operation. When an operation to be performed by the first storage device 50_1 is performed by the second storage device 50_2, such operation may be performed on the second share area 51_2 in the second storage device 50_2. Alternatively, when an operation to be performed by the second storage device 50_2 is performed by the first storage device 50_1, such operation may be performed on the first share area 51_1 in the first storage device 50_1.

In an embodiment, in the case where the operation to be performed by the first storage device 50_1 is performed by the second storage device 50_2 on the second share area 51_2 therein, the host 300 may generate and output a request message REQ_MSG of reading data stored in the second share area 51_2 to re-perform the operation on and by the first storage device 50_1. That is, the host 300 may read data stored in the second share area 51_2 and provide the read data to the first storage device 50_1. Alternatively, in the case where the operation to be performed by the second storage device 50_2 is performed by the first storage device 50_1 on the first share area 51_1 therein, the host 300 may generate and output a request message REQ_MSG of reading data stored in the first share area 51_1 to re-perform the operation on and by the second storage device 50_2. That is, the host 300 may read data stored in the first share area 51_1 and provide the read data to the second storage device 50_2.

Figure 5:
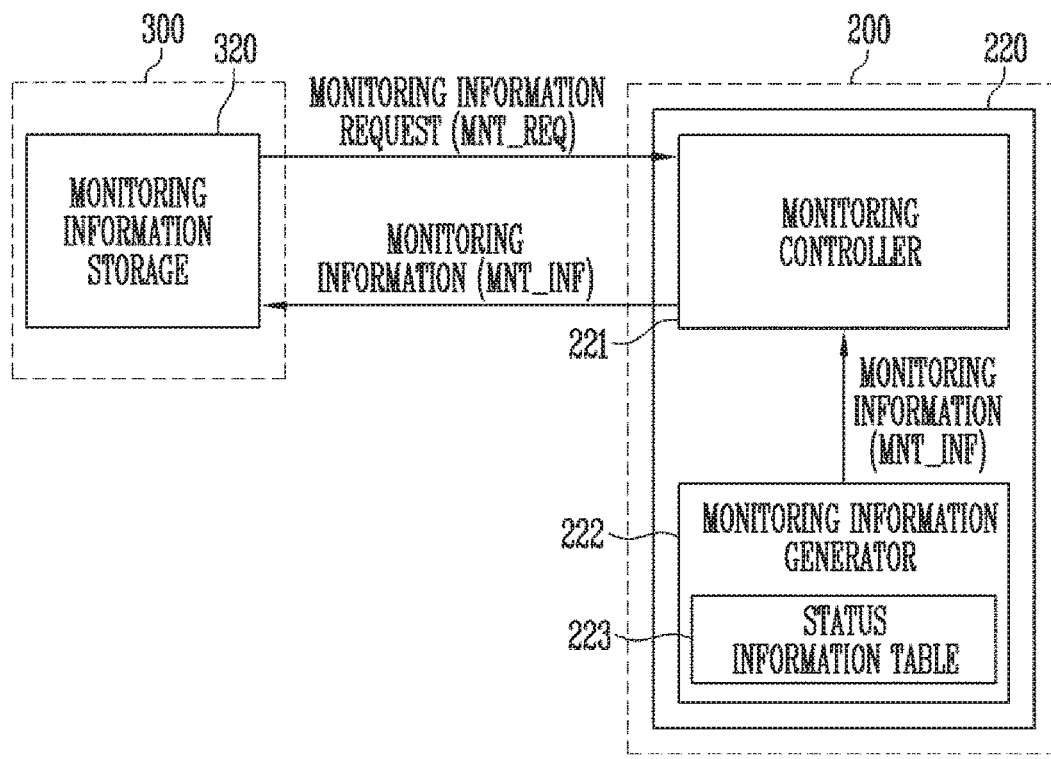
FIG. 5 is a diagram illustrating a request and a response between the host and a memory controller, such as that of FIG. 1.

FIG. 5 is a diagram illustrating a request and a response between the host 300 and the memory controller 200 of FIG. 1.

Referring to FIGS. 1 and 5, the memory controller 200 may include the monitor 220 configured to store a current status of each of the storage devices 50 and provide the stored current statuses to the host 300. The host 300 may include the monitoring information storage 320 configured to store monitoring information MNT_INF indicative of the current status of each of the storage devices, which is received from the monitor 220.

The monitor 220 may include a monitoring controller 221, which may store the monitoring information MNT_INF. The monitoring information MNT_INF may be generated by a monitoring information generator 222. The host 300 may send a monitoring information request MNT_REQ to the monitor 220 on a set cycle, wherein the set cycle may also be referred as a preset cycle. The monitoring controller 221 may provide the monitoring information MNT_INF to the host 300 in response to such a request provided on the set cycle.

In an embodiment, the monitor 220 may include the monitoring information generator 222. The monitoring information generator 222 may generate monitoring information MNT_INF based on the extended status information and the normal status information that are stored in the status information table 223. The extended status information and the normal status information may include information about the current status of the storage device 50.

The monitoring information generator 222 may include a status information table 223. The status information table 223 may be the extended status information table 223_1 or the normal status information table 223_2. During an initialization operation, based on an initialization message received from the host 300, the status information table 223 may be determined to be the extended status information table 223_1 or the normal status information table 223_2. After such determination, the monitoring information generator 222 may generate monitoring information MNT_INF based on the statuses of the storage devices 50 included in the corresponding table. The extended status information table 223_1 may include extended status information of the storage devices 50. The normal status information table 223_2 may include normal status information of the storage devices 50.

In the case where the device information DI for a particular storage device 50 includes information that the storage device 50 supports a share operation with another of the storage devices 50, the initialization message received from the host 300 may be a first initialization message. Alternatively, in the case where the device information DI includes information that a storage device does not support a share operation with another storage device, the initialization message may be a second initialization message. In other words, the first initialization message indicates that the associated storage device may share data with another storage device. In contrast, the second initialization message indicates that the associated storage device cannot share data with another storage device.

During the initialization operation, when the memory controller 200 receives the first initialization message from the host 300, the status information table 223 may be determined to be the extended status information table 223_1. During the initialization operation, when the memory controller 200 receives the second initialization message from the host 300, the status information table 223 may be determined to be the normal status information table 223_2.

In other words, when a share operation between storage devices is possible, the monitoring information generator 222 may receive the first initialization message from the host 300 at an initialization step and generate monitoring information MNT_INF based on the extended status information stored in the extended status information table 223_1. When a share operation between storage devices is impossible, the monitoring information generator 222 may receive the second initialization message from the host 300 at the initialization step and generate monitoring information MNT_INF based on the normal status information stored in the normal status information table 223_2.

The extended status information table 223_1 and the normal status information table 223_2 will be described in more detail with reference to FIGS. 6A and 6B.

The monitoring information generator 222 may generate monitoring information MNT_INF and provide it to the monitoring controller 221. The monitoring information MNT_INF may include information indicating the current status of the storage device 50. The monitoring information MNT_INF may be generated based on the initialization message received from the host 300, at the initialization step. In other words, the monitoring information MNT_INF may be generated based on the normal status information and the extended status information that are stored in the status information table 223.

The monitoring information generator 222 may generate information indicating a ready status and output it to the monitoring controller 221 until the status of the storage device 50 changes. When the status of the storage device 50 changes, the monitoring information generator 222 may sense such change, and in response may generate information indicating the changed status and output it to the monitoring controller 221.

The monitoring information generator 222 may generate information indicating a changed status each time the status of the storage device 50 changes, which information represents updated monitoring information that is based on the changed normal status information or extended status information. The monitoring information generator 222 may output the updated monitoring information to the monitoring controller 221.

The host 300 may include the monitoring information storage 320. The monitoring information storage 320 may provide, to the monitoring controller 221, a monitoring information request MNT_REQ for obtaining the monitoring information MNT_INF stored in the monitoring controller 221. In detail, the monitoring information storage 320 may send a monitoring information request MNT_REQ to the monitoring controller 221 on a set cycle. The monitoring controller 221 may provide the monitoring information MNT_INF to the host 300 in response to such request.

The monitoring information storage 320 may store information about respective current statuses of devices capable of performing a share operation among the plurality of storage devices. The host 300 may determine whether a share operation may be performed, based on the information stored in the monitoring information storage 320. The share operation may include a series of operations to be performed on another storage device that are performed on the storage device 50.

FIGS. 6A and 6B are diagrams illustrating the status information table 223 of FIG. 5.

Referring to FIGS. 6A and 6B, the status information table 223 may be the extended status information table 223_1 or the normal status information table 223_2, as determined by an initialization message received from the host 300.

In detail, during the initialization operation, when the memory controller 200 receives the first initialization message from the host 300, the status information table 223 may be determined to be the extended status information table 223_1. During the initialization operation, when the memory controller 200 receives the second initialization message from the host 300, the status information table 223 may be determined to be the normal status information table 223_2.

In an embodiment, FIG. 6A illustrates the extended status information table 223_1 when a share operation between storage devices is performed. FIG. 6B illustrates the normal status information table 223_2 when a share operation between storage devices is not performed.

When a share operation between storage devices is possible, the monitoring information generator 222 may receive the first initialization message from the host 300 at an initialization step and set the extended status information table 223_1 as the status information table 223.

The monitoring information generator 222 may generate monitoring information MNT_INF indicating any one status included in the extended status information table 223_1. The monitoring information MNT_INF may include the status and/or status data STA_DATA indicating which of the possible statuses the storage device 50 is in.

In an embodiment, the extended status information table 223_1 may store the status and/or status data STA_DATA of the storage device 50. The extended status information table 223_1 may store the status data STA_DATA corresponding to the status of each storage device 50.

The status of a storage device 50 may be determined from the statuses stored in the extended status information table 223_1 and may be any of a ready status Ready, a busy status Busy, a high temperature status Need to cool down, a data back-up required status Need to back-up data, a recovery required status Need to recovery, and a failure analysis data back-up required status Need to back-up FA data. The extended status information table 223_1 may include information about various statuses as well as the statuses themselves.

Among the possible statuses stored in the extended status information table 223_1, statuses other than the read status Ready may indicate that a share operation with another storage device may be performed. In other words, any non-ready status may be a status in which the host 300 provides a share operation request for performing a share operation between storage devices.

In an embodiment, the status data STA_DATA corresponding to the status of each storage device 50 capable of performing a share operation may be '0' when in the ready status Ready, '1' when in the busy status Busy, '2' when in the high temperature status Need to cool down, '3' when in the data back-up required status Need to back-up data, '4' when in the recovery required status Need to recovery, and '5' when in the failure analysis data back-up required status Need to back-up FA data.

In detail, the ready status Ready may represent a status in which the storage device 50 may perform an operation. Therefore, the ready status Ready may be a normal status. The storage device 50 that is in the ready status Ready may receive a request message REQ_MSG from the host 300 and perform an operation corresponding to the request message REQ_MSG.

In an embodiment, the busy status Busy may represent a status in which the storage device 50 is performing an operation. Therefore, the storage device 50 that is in the busy status Busy may not receive a request message REQ_MSG from the host 300. Furthermore, the storage device 50 may not perform an operation corresponding to the request message REQ_MSG.

In an embodiment, the high temperature status Need to cool down may represent that the storage device 50 is in a high temperature status. The storage device 50 may enter a high temperature status, for example, as result of having performed a relatively large number of write and erase operations and/or as a result of having a relatively high data retention period. When the monitoring information MNT_INF represents that the storage device 50 is in the high temperature status Need to cool down, such storage device may not be permitted to perform a write/erase operation until the device exits that state.

Referring to FIG. 4, the status of the first storage device SD1 may be the high temperature status Need to cool down. Hence, a write/erase operation may not be performed by the first storage device SD1. Thus, when data is stored in the first share area SR1 of the first storage device SD1, an erase operation may not be performed on the first share area SR1. Such data stored in the first share area SR1 may be stored in another storage device without an erase operation being performed on the first share area SR1.

Consequently, in the case where the data is stored in the first share area SR1 and the status of the first share area SR1 is the high temperature status Need to cool down, an erase operation may not be performed on the first share area SR1.

In an embodiment, when the monitoring information MNT_INF represents that the storage device 50 is in the high temperature status Need to cool down, the host 300 that has received the monitoring information MNT_INF may determine to perform a write operation on another storage device not having the high temperature status. Referring to FIG. 4, when the status of the first storage device SD1 is the high temperature status Need to cool down, the host 300 may select another storage device, e.g., the second storage device SD2, on which the write operation that was to be performed by the first storage device SD1 is to be performed.

Therefore, since the host 300 may request the write operation to the second storage device SD2 before the first storage device SD1 enters the low temperature status, the overall input/output performance of the storage device may be enhanced. In detail, in response to a write operation request of the host 300, the write operation may be performed on the second share area SR2 of the second storage device SD2.

Consequently, since the monitoring information MNT_INF indicates the high temperature status Need to cool down, the operation to be performed by the corresponding storage device may be performed by another storage device. Therefore, since a write/erase operation or the like is not performed by the storage device that is in the high temperature status Need to cool down, a load to be applied to the storage device is reduced, whereby the overall input/output performance may be enhanced.

Referring to FIG. 4, after the write operation has been performed on the second share area SR2 of the second storage device SD2, the data stored in the second share area SR2 may be stored in the first storage device SD1. In detail, if the status of the first storage device SD1 changes from the high temperature status Need to cool down to the low temperature status Coo Down, a write operation may be performed by the first storage device SD1 for the data stored in the second share area SR2. The first storage device SD1 may perform a write operation in the ready status Ready during an idle time duration. If the data stored in the second share area SR2 is stored in the first storage device SD1, an erase operation may be performed on the second share area SR2. Since the data to be stored in the first storage device SD1 has been stored in the first storage device SD1, the erase operation may be performed on the second share area SR2.

In an embodiment, the data back-up required status (Need to back-up data) may indicate that there is a need to back up data stored in the storage device 50 to another storage device because there is a risk of loss of the data stored in the storage device 50. The loss of the data stored in the storage device 50 may occur during an emergency such as sudden power off (SPO), end of life (EOL), or repair on system (ROS).

When an emergency occurs, the storage device 50 may provide monitoring information MNT_INF indicating the data back-up required status to the monitoring information storage 320. The request message controller 330 may determine whether a share operation may be performed, based on the monitoring information MNT_INF provided from the monitoring information storage 320. The request message controller 330 may provide a data back-up request message and back-up data to a storage device that includes monitoring information MNT_INF of the ready status.

After the data has been backed up, the status of the storage device 50 may change from the data back-up required status to the ready status. In this case, the request message controller 330 may provide a recovery request message RR_MSG to the storage device to which the data has been backed up, based on share operation information SHA_INF. In the case where an operation to be performed by any one of the storage devices capable of performing a share operation has been performed by another storage device, the recovery request message RR_MSG may be a message provided to reperform the corresponding operation. Therefore, the storage device to which the data has been backed up may provide the data, i.e., share data SHA_DATA, to be stored in the original storage device in response to the recovery request message RR_MSG. To store the data in the original storage device, a request message REQ_MSG generated by the request message controller 330 and the share data SHA_DATA may be provided to the original storage device.

In an embodiment, the recovery required status (Need to recovery) may indicate that a recovery operation is required to reperform, by the storage device 50, the operation that has been performed by another storage device because the operation was not performed by the storage device 50. The recovery required status may indicate a status in which a self-recovery operation that the storage device itself performs without involvement of the host 300 is required. In detail, the recovery required status may be a status in which a background operation such as a garbage collection operation is required.

In an embodiment, a failure analysis data back-up required status Need to back-up FA data of the statuses of the storage device 50 may indicate that the storage device 50 may no longer perform an operation. In other words, the failure analysis data back-up required status Need to back-up FA data may indicate that there is a need to store a log of write/erase operations, etc. performed by the storage device 50.

In detail, the status in which there is a need to store the log of the write/erase operations, etc. performed by the storage device 50 may include a status in which there is a need to store failure analysis data (FA data). In other words, the storage device 50 may provide the FA data to the host 300 immediately before the end of life (EOL). The host 300 may analyze the status of the corresponding storage device based on the FA data provided to the host 300. Furthermore, the operation to be performed by the corresponding storage device may be performed by another storage device based on the FA data.

When the storage device provides the FA data to the host 300, the monitoring information generator 222 may generate monitoring information MNT_INF indicating the failure analysis data back-up required status Need to back-up FA data.

In an embodiment, the monitoring information generator 222 may include the normal status information table 223_2. In the case where a share operation between storage devices is impossible, the monitoring information generator 222 may receive the second initialization message from the host 300 at an initialization step and set the normal status information table 223_2 as the status information table 223.

In detail, the normal status information table 223_2 may store the status and/or status data STA_DATA of the storage device 50. The normal status information table 223_2 may store the status data STA_DATA corresponding to the status of each storage device 50.

The status of the storage device 50 that is stored in the normal status information table 223_2 may be any one of the ready status Ready and the busy status Busy. The status data STA_DATA corresponding to the status of the storage device 50 may be '0' when in the ready status Ready, and '1' when in the busy status Busy.

In detail, the ready status Ready may represent a status in which the storage device 50 may perform an operation. Therefore, the ready status Ready may be a normal status. The storage device 50 that is in the ready status Ready may receive a request message REQ_MSG from the host 300 and perform an operation corresponding to the request message REQ_MSG.

In an embodiment, the busy status Busy may represent a status in which the storage device 50 is performing an operation. Therefore, the storage device 50 that is in the busy status Busy may not receive a request message REQ_MSG from the host 300. Furthermore, the storage device 50 may not perform an operation corresponding to the request message REQ_MSG.

FIG. 7 is a diagram illustrating monitoring information MNT_INF stored in the monitoring information storage 320 of FIG. 1.

Referring to FIGS. 6A, 6B, and 7, FIG. 7 illustrates the monitoring information storage 320 in which monitoring information on devices capable of performing a share operation among the plurality of storage devices are stored. In detail, the monitoring information storage 320 may store monitoring information MNT_INF separately for respective storage devices. The monitoring information MNT_INF may include information indicating the current status of each storage device 50. In the present embodiment, the first storage device SD1 and the second storage device SD2 may perform a share operation.

The monitoring information storage 320 may store information about respective current statuses of the devices capable of performing a share operation. The host 300 may determine whether the share operation may be performed, based on the information stored in the monitoring information storage 320. The share operation may be as previously explained.

The monitoring information storage 320 may separately store the monitoring information MNT_INF provided from the monitoring controllers 221 of the respective storage devices. The monitoring information MNT_INF may be information including the status and/or status data STA_DATA of the storage device 50. The status data STA_DATA may data corresponding to each status.

In an embodiment, the monitoring information MNT_INF received from the monitoring controller of the first storage device SD1 may include information indicating the data backup required status (Need to back-up data) and/or a status data (STA_DATA) value of '3', which indicates such status. The monitoring information MNT_INF received from the monitoring controller of the second storage device SD2 may include information indicating the ready status Ready and/or a corresponding status data (STA_DATA) value of '0'.

The monitoring information storage 320 may separately store the monitoring information MNT_INF of the first storage device SD1 and the second storage device SD2 that are storage devices capable of performing a share operation.

Since the monitoring information MNT_INF indicating that the first storage device SD1 is in the data back-up required status (Need to back-up data) has been stored in the monitoring information storage 320, the host 300 may perform a share operation. In other words, since the first storage device SD1 in the data back-up required status (Need to back-up data) may not perform an operation, the host 300 may provide, to the second storage device SD2, data and a request message REQ_MSG for performing, by the second storage device SD2, the operation to be performed by the first storage device SD1. The second storage device SD2 may perform such operation based on the request message REQ_MSG of the host 300, on the second share area 51_2 in the second storage device SD2.

Figure 8:
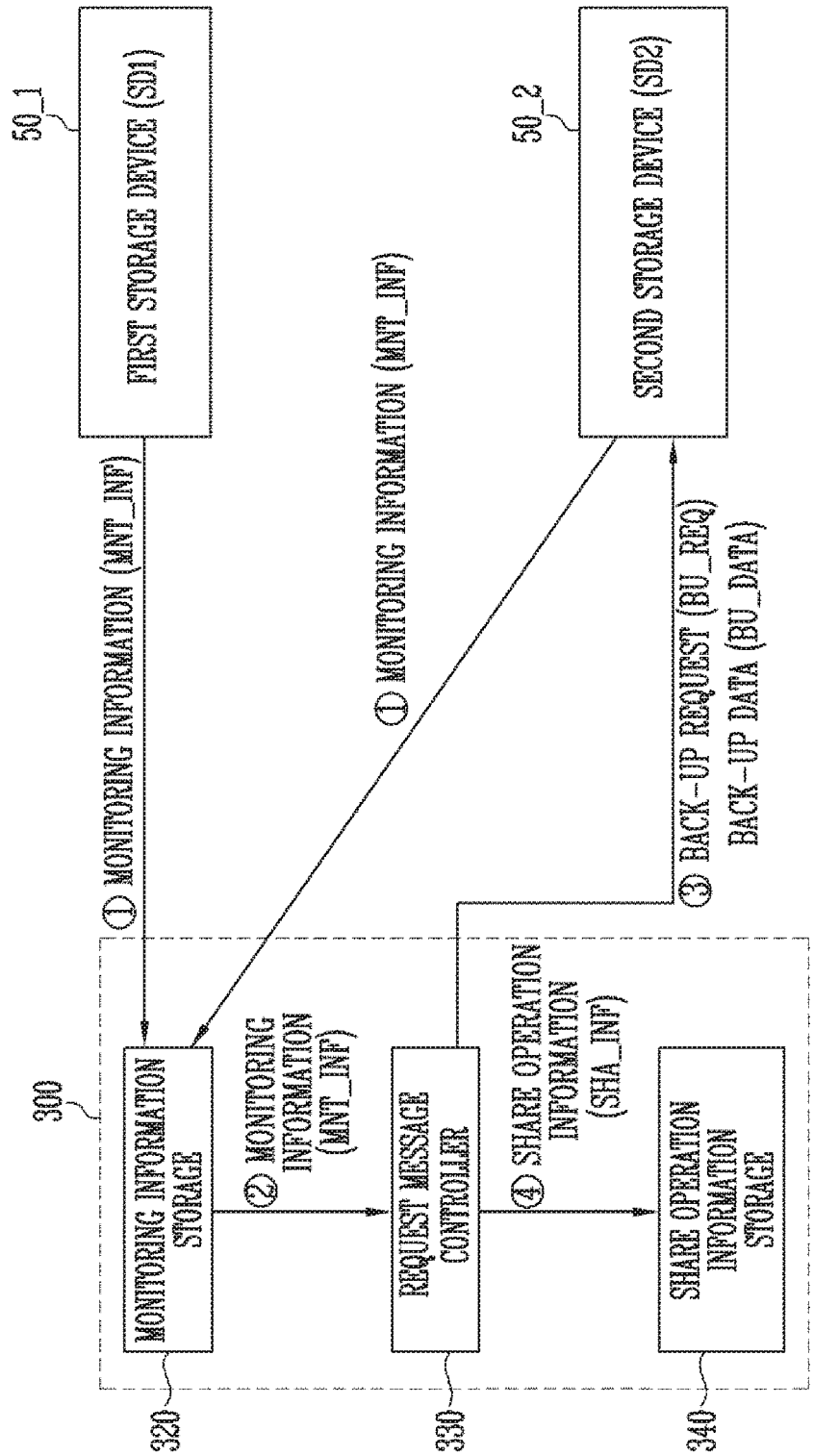
FIG. 8 is a diagram illustrating a share operation in accordance with an embodiment of the present disclosure.

FIG. 8 is a diagram illustrating a share operation in accordance with an embodiment of the present disclosure.

Referring to FIG. 8, the host 300 may include a monitoring information storage 320, a request message controller 330, and a share operation information storage 340 so as to perform a share operation between storage devices. The share operation may be as previously explained.

Referring to FIG. 8, it is assumed that, during an initialization operation, the host 300 has determined that a share operation between the first storage device SD1 and the second storage device SD2 is possible, and thus provided the first initialization message to the first storage device SD1 and the second storage device SD2 to perform the share operation. Furthermore, it is assumed that, based on the first initialization message, the status information table 223 is set to the extended status information table 223_1. In addition, it is assumed that the first storage device SD1 is in the data back-up required status (Need to back-up data), and the second storage device SD2 is in the ready status Ready.

In an embodiment, the first storage device SD1 and the second storage device SD2 include the same share supported information in their device information DI, so that a share operation therebetween is possible. Furthermore, at the initialization step, the share information storage 310 may receive the device information DI from each storage device, and then store share information SI indicating that the first storage device SD1 and the second storage device SD2 may perform the share operation.

In an embodiment, each of the first storage device SD1 and the second storage device SD2 may provide monitoring information MNT_INF representing the status of the corresponding device to the monitoring information storage 320 (see, reference ①). The monitoring information MNT_INF may include information indicating the current status of the storage device 50. The monitoring information MNT_INF may be generated based on the first initialization message received from the host 300 at the initialization step. In other words, the monitoring information MNT_INF may be generated based on the extended status information that is stored in the extended status information table 223_1.

The monitoring information storage 320 that has received the monitoring information MNT_INF from each of the first storage device SD1 and the second storage device SD2 may store the monitoring information MNT_INF separately for the respective storage devices. The monitoring information storage 320 may provide the stored monitoring information MNT_INF to the request message controller 330 (see, reference ②).

The monitoring information storage 320 may store the monitoring information MNT_INF about the current statuses of the first and second storage devices SD1 and SD2. The request message controller 330 may determine whether a share operation may be performed, based on the monitoring information MNT_INF provided from the monitoring information storage 320. Since the monitoring information MNT_INF provided from the first storage device SD1 includes information representing the data back-up required status Need to back-up data, the request message controller 330 may generate a request message REQ_MSG needed for the first storage device SD1 and the second storage device SD2 to perform the share operation.

In an embodiment, the request message controller 330 may provide data and the request message REQ_MSG for the share operation between the plurality of storage devices to the corresponding storage device (see reference ③).

In detail, the monitoring information MNT_INF of the first storage device SD1 may include status information of the data back-up required status (Need to back-up data). The monitoring information MNT_INF of the second storage device SD2 may include status information of the ready status Ready. Since the monitoring information MNT_INF of the first storage device SD1 includes information indicating that it is in a non-ready status, the first storage device SD1 may not receive the request message REQ_MSG from the request message controller 330 or perform an operation corresponding to the request message REQ_MSG.

The request message controller 330 may receive the monitoring information MNT_INF of each of the first storage device SD1 and the second storage device SD2 from the monitoring information storage 320. In this case, the request message controller 330 may generate a request message REQ_MSG for a share operation between the first storage device SD1 and the second storage device SD2. The generated request message may be a back-up request (BU_REQ) message. Data corresponding to the back-up request (BU_REQ) message may be back-up data BU_DATA. The request message controller 330 may provide the back-up request (BU_REQ) message and the back-up data BU_DATA to the second storage device SD2 (see reference ③). The second storage device SD2 may back up the data stored in the first storage device SD1 to the second storage device SD2, based on the back-up request (BU_REQ) message and the back-up data BU_DATA. In detail, the data stored in the first storage device SD1 may be backed up to the second share area SR2 of the second storage device SD2.

In an embodiment, when the request message REQ_MSG for performing, by the second storage device SD2, the operation to be performed by the first storage device SD1 is provided to the second storage device SD2, the request message controller 330 may provide the share operation information SHA_INF to the share operation information storage 340 (see reference ④). In detail, when the request message controller 330 provides the back-up request (BU_REQ) message and the back-up data BU_DATA to the second storage device SD2, the share operation information SHA_INF may be provided to the share operation information storage 340.

The share operation information SHA_INF may be about the operation to be performed by the first storage device SD1. The share operation information SHA_INF may include information about a command, an address, and data for the operation to be performed by the first storage device SD1. Therefore, the share operation information SHA_INF may include information about the back-up request (BU_REQ) message and the back-up data BU_DATA of the first storage device SD1.

The share operation information SHA_INF may include information about a storage device on which the operation to be performed by the first storage device SD1 has been performed. Hence, the share operation information SHA_INF may include information about the second storage device SD2 on which the operation to be performed by the first storage device SD1 has been performed. The information about the second storage device SD2 may include information about the second share area SR2 of the second storage device SD2 on which the operation to be performed by the first storage device SD1 has been performed.

The share operation information storage 340 may store, for each storage device, the share operation information SHA_INF that is information about the share operation performed with another storage device.

Figure 9:
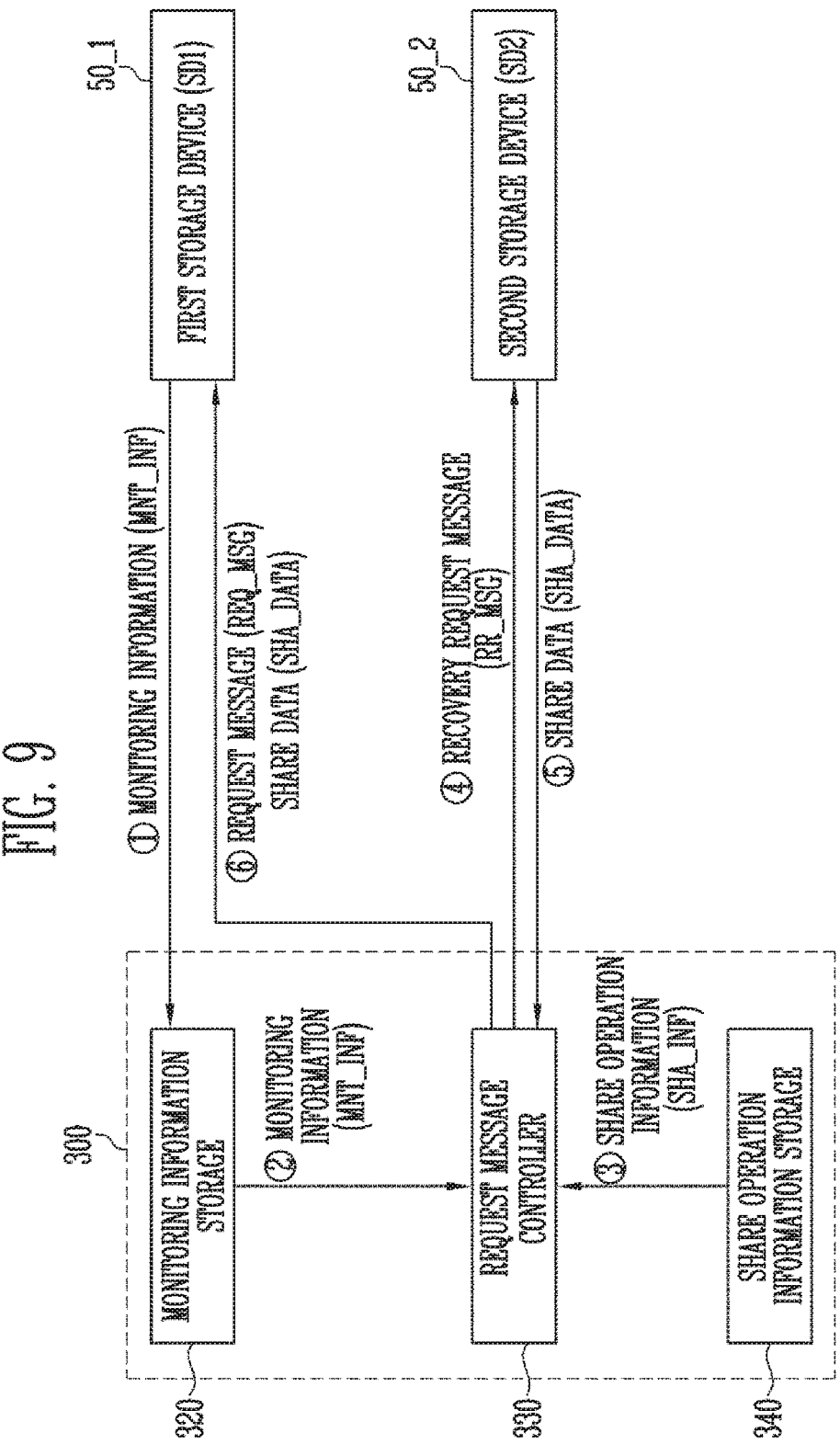
FIG. 9 is a diagram illustrating a share operation in accordance with an embodiment of the present disclosure.

FIG. 9 is a diagram illustrating a share operation in accordance with an embodiment of the present disclosure.

Referring to FIG. 9, the host 300 may include a monitoring information storage 320, a request message controller 330, and a share operation information storage 340 so as to perform a share operation between storage devices. The share operation may be to determine storage devices capable of performing the share operation among the plurality of storage devices and then to perform an operation to be performed by any one storage device, by another storage device. Each of the plurality of storage devices may be a device configured to store data.

Referring to FIG. 9, it is assumed that, during an initialization operation, the host 300 may perform a share operation between the first storage device SD1 and the second storage device SD2. Furthermore, it is assumed that, based on the first initialization message, the status information table 223 is set to the extended status information table 223_1. It is assumed that the status of the first storage device SD1 is changed from a non-ready status to the ready status Ready. It is assumed that, before the status of the first storage device SD1 is changed, an operation to be performed by the first storage device SD1 has been performed on the second share area SR2 of the second storage device SD2.

In an embodiment, the first storage device SD1 and the second storage device SD2 include the same device information DI with respect to shared support, so that a share operation therebetween is possible. Furthermore, at the initialization step, the share information storage 310 may receive the device information DI from each storage device, and then store share information SI indicating that the first storage device SD1 and the second storage device SD2 may perform the share operation.

In an embodiment, the monitoring information storage 320 that has received the monitoring information MNT_INF from each of the first storage device SD1 and the second storage device SD2 may store the monitoring information MNT_INF separately. After each of the first storage device SD1 and the second storage device SD2 has provided the monitoring information MNT_INF indicating the status of the corresponding storage device to the monitoring information storage 320, the first storage device SD1 may provide monitoring information MINT_INF indicating a changed status to the monitoring information storage 320.

In detail, the status of the first storage device SD1 may be changed from a non-ready status to the ready status Ready. Hence, based on the changed status of the first storage device SD1, the monitoring information MNT_INF may be updated. The monitoring information generator 222 may generate updated monitoring information based on changed extended status information. The monitoring information generator 222 may output the updated monitoring information MNT_INF to the monitoring controller 221. The monitoring controller 221 may provide the updated monitoring information MNT_INF to the monitoring information storage 320 (see reference ①), which may provide the updated monitoring information MNT_INF to the request message controller 330 (see, reference ②).

When the request message controller 330 receives the updated monitoring information MNT_INF, the share operation information storage 340 may provide the share operation information SHA_INF to the request message controller 330 in response to a request of the request message controller 330 (see, reference ③).

In an embodiment, the share operation information SHA_INF may be information about the operation to be performed by the first storage device SD1. The share operation information SHA_INF may include information about a command, an address, and data for the operation to be performed by the first storage device SD1. The share operation information SHA_INF may include information about a storage device on which the operation to be performed by the first storage device SD1 has been performed. Hence, the share operation information SHA_INF may include information about the second storage device SD2 on which the operation to be performed by the first storage device SD1 has been performed.

The request message controller 330 may provide a recovery request message RR_MSG to the second storage device SD2, based on share operation information SHA_INF (see reference ④). In the case where an operation to be performed by any one of the storage devices capable of performing a share operation has been performed by another storage device, the recovery request message RR_MSG may be provided to reperform the corresponding operation. In an embodiment, the recovery request message RR_MSG may be for reading share data SHA_DATA.

In the case where the second storage device SD2 has performed the operation to be performed by the first storage device SD1, the first storage device SD1 may reperform the corresponding operation. To allow the first storage device SD1 to perform the operation, the request message controller 330 may provide a recovery request message RR_MSG to the second storage device SD2.

When the recovery request message RR_MSG is received from the request message controller 330, the second storage device SD2 may provide the share data SHA_DATA to the request message controller 330 (see reference ⑤). The share data SHA_DATA may be stored in the second storage device SD2 when the operation to be performed by the first storage device SD1 is performed by the second storage device SD2. In detail, in the case where the operation to be performed by the first storage device SD1 is a program operation, the share data SHA_DATA may be stored in the second storage device SD2 as a result of performing the program operation on the second storage device SD2. The share data SHA_DATA may be stored in the second share area SR2 of the second storage device SD2. Based on the recovery request message RR_MSG of the request message controller 330, the share data SHA_DATA stored in the second share area SR2 of the second storage device SD2 may be provided to the request message controller 330.

In an embodiment, the request message controller 330 may generate a request message REQ_MSG for performing a share operation between storage devices. In other words, the request message controller 330 may generate a request message REQ_MSG for performing a share operation between the first storage device SD1 and the second storage device SD2.

In detail, the request message controller 330 may generate a request message REQ_MSG for reperforming (recovering) the operation on the first storage device SD1. The request message controller 330 may provide the share data SHA_DATA received from the second storage device SD2, along with the generated request message REQ_MSG, to the first storage device SD1 (see reference ⑥). The first storage device SD1 may perform the operation based on the request message REQ_MSG and the share data SHA_DATA. The operation to be performed by the first storage device SD1 based on the request message REQ_MSG and the share data SHA_DATA may be performed on the user area 103 of the first storage device SD1.

If the share data SHA_DATA stored in the second share area SR2 of the second storage device SD2 is stored in the user area 103 of the first storage device SD1, an erase operation may be performed on the second share area SR2. In detail, since the data, i.e., the share data SHA_DATA, to be stored in the first storage device SD1 has been stored in the first storage device SD1, the erase operation may be performed on the second share area SR2.

Figure 10:
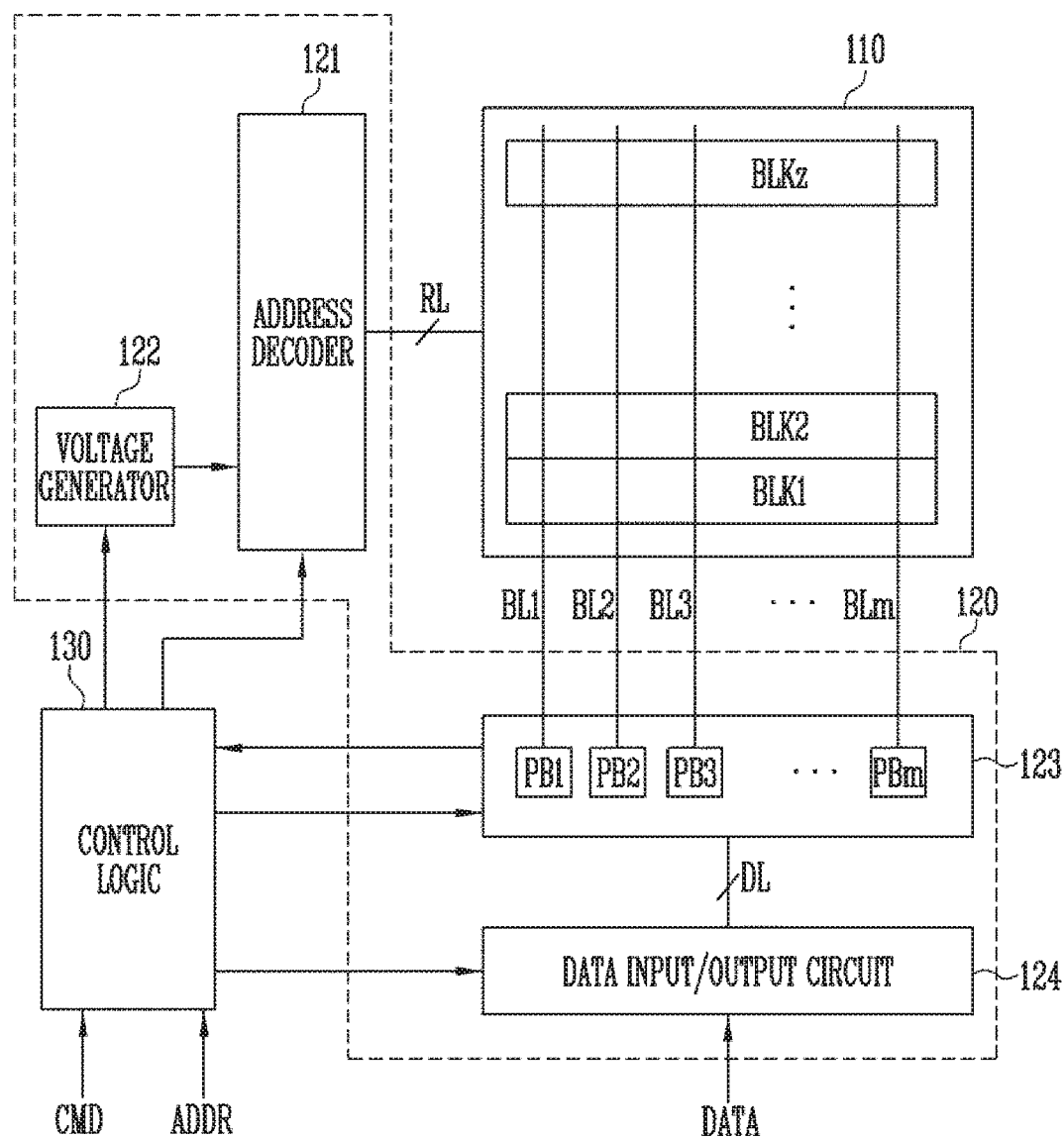
FIG. 10 is a block diagram illustrating a configuration of a memory device, such as that of FIG. 1.

FIG. 10 is a block diagram illustrating an exemplary configuration of the memory device 100 of FIG. 1.

Referring to FIG. 10, the memory device 100 may include a memory cell array 110, a peripheral circuit 120, and control logic 130.

The memory cell array 110 may include a plurality of memory blocks BLK1 to BLKz. The plurality of memory blocks BLK1 to BLKz are coupled to an address decoder 121 through row lines RL. The plurality of memory blocks BLK1 to BLKz are coupled to a read/write circuit 123 through bit lines BL1 to BLm. Each of the memory blocks BLK1 to BLKz may include a plurality of memory cells.

The memory blocks may be divided into user blocks configured to store user data, and system blocks configured to store system data. Each of the user blocks may be a free block or a data block depending on whether data has been stored therein. A free block may be an empty block in which no data is stored. A data block may store data. The data stored in the data block may be valid data or invalid data.

A block that cannot store data among the memory blocks may be a bad block. A bad block may be a manufacture bad block (MBB) which occurs during a process of manufacturing the memory device 100, or a growing bad block (GBB) which is a memory block that becomes bad during use. In an embodiment, a memory block including a page in which a program failure has occurred may be a growing bad block.

Each memory block may include a plurality of memory cells configured to store data. In an embodiment, the plurality of memory cells may be nonvolatile memory cells. Memory cells coupled to the same word line among the plurality of memory cells are defined as one page. In other words, the memory cell array 110 may include a plurality of pages. In an embodiment, each of the memory blocks BLK1 to BLKz included in the memory cell array 110 may include a plurality of dummy cells. One or more dummy cells may be coupled in series between a drain select transistor and memory cells. One or more dummy cells may be coupled in series between a source select transistor and memory cells.

Each of the memory cells of the memory device 100 may be a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, a read/write circuit 123, and a data input/output circuit 124.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address among the received addresses ADDR. The address decoder 121 may apply voltages provided from the voltage generator 122 to at least one of the word lines WL coupled to the selected memory block according to the decoded row address, thus selecting the word line(s) coupled to the selected memory block.

During a program operation, the address decoder 121 may apply a program voltage to a selected word line and apply a program pass voltage having a level lower than that of the program voltage to unselected word lines. During a program verify operation, the address decoder 121 may apply a verify voltage to a selected word line and apply a verify pass voltage higher than the verify voltage to unselected word lines. During a read operation, the address decoder 121 may apply a read voltage to a selected word line and apply a read pass voltage higher than the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select at least one of the memory blocks BLK1 to BLKz according to the decoded block address. During the erase operation, the address decoder 121 may apply a ground voltage to word lines coupled to the selected memory block.

In an embodiment, the address decoder 121 may decode a column address among the transmitted addresses ADDR. A decoded column address DCA may be transmitted to the read/write circuit 123. For example, the address decoder 121 may include components such as a row decoder, a column decoder, and an address buffer.

The voltage generator 122 may generate a plurality of voltages using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using the external supply voltage or the internal supply voltage. The voltage generator 122 may generate various voltages required in the memory device 100. For example, the voltage generator 122 may generate a plurality of program voltages, a plurality of pass voltages, a plurality of select read voltages, or a plurality of unselect read voltages.

For example, the voltage generator 122 may include a plurality of pumping capacitors for receiving the internal supply voltage, and generate a plurality of voltages by selectively activating the plurality of pumping capacitors under control of the control logic 130. The generated voltages may be supplied to the memory cell array 110 by the address decoder 121.

The read/write circuit 123 may include first to m-th page buffers PB1 to PBm (m is a positive integer, which are coupled to the memory cell array 110 through the first to m-th bit lines BL1 to BLm, respectively. The first to m-th page buffers PB1 to PBm may operate under control of the control logic 130.

The first to m-th page buffers PB1 to PBm may perform data communication with the data input/output circuit 124. During a program operation, the first to m-th page buffers PB1 to PBm may receive data DATA to be stored through the data input/output circuit 124 and data lines DL.

During the program operation, a program pulse may be applied to a word line selected according to a row address. Here, the first to m-th page buffers PB1 to PBm may transmit, through the bit lines BL1 to BLm, data DATA received from the data input/output circuit 124 to memory cells coupled to the selected word line. At least one of the memory cells coupled to the selected word line may be programmed according to the transmitted data DATA. The threshold voltage of a memory cell coupled to a bit line to which a program enable voltage (for example, a ground voltage) is applied may be increased. The threshold voltage of a memory cell coupled to a bit line to which a program inhibit voltage (for example, a supply voltage) is applied may be retained.

During a program verify operation, the first to m-th page buffers PB1 to PBm may read page data from memory cells of a selected word line through the bit lines BL1 to BLm.

During a read operation, the read/write circuit 123 may read page data DATA from memory cells of a selected word line through the bit lines BL, and output the read page data DATA to the data input/output circuit 124.

During an erase operation, the read/write circuit 123 may float the bit lines BL. In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) for receiving inputted data. During a program operation, the data input/output circuit 124 may receive data DATA to be stored from an external controller (not shown). During a read operation, the data input/output circuit 124 may output, to the external controller, the data received from the first to m-th page buffers PB1 to PBm included in the read/write circuit 123.

The control logic 130 is connected to the address decoder 121, the voltage generator 122, the read/write circuit 123, and the data input/output circuit 124. The control logic 130 may control the overall operation of the memory device 100. The control logic 130 may operate in response to a command CMD transmitted from an external device.

Figure 11:
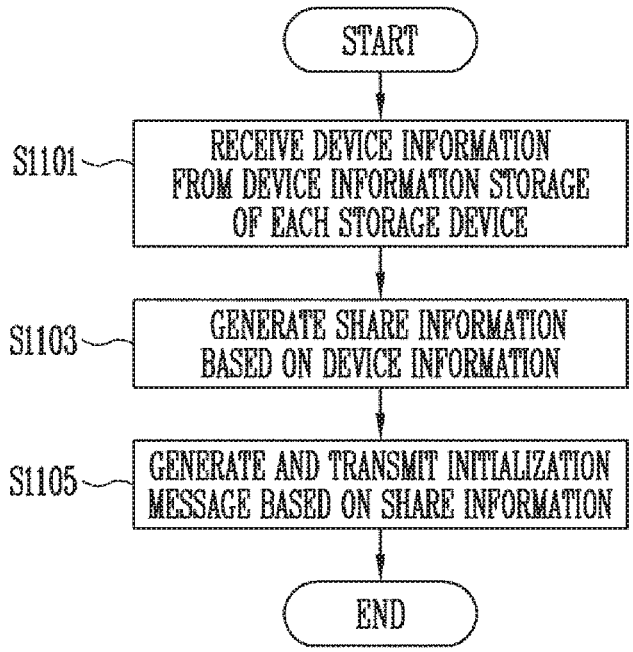
FIG. 11 is a diagram illustrating an initialization operation of the host in accordance with an embodiment of the present disclosure.

FIG. 11 is a diagram illustrating an initialization operation of the host 300 in accordance with an embodiment of the present disclosure.

Referring to FIG. 11, at step S1101, during an initialization operation, the host 300 may receive device information DI from the device information storage 210 of each storage device. In detail, the device information DI may indicate whether the storage device 50 may support a share operation with another storage device, as previously explained.

In other words, the device information DI may include information indicating whether the associated storage device may share data with another data storage device, which information may be share function information. The share function information may include information about whether an operation of receiving a request message and data from the host 300 or an operation of providing data to the host that was supposed to be performed by one data storage device may be performed on another storage device.

At step S1103, the host 300 may generate share information SI based on the device information DI. In detail, the share information SI may include information needed for storage devices to perform a share operation. The share information SI may include information to classify each of the plurality of storage devices. The share information SI may be determined after having received device information DI from each of the plurality of storage devices. The device information DI of a given storage device may indicate whether that storage device supports a share operation with another storage device. The share information SI may include information needed to determine share-operation-supported storage devices capable of performing the share operation among the plurality of storage devices.

At step S1105, the host 300 may generate and transmit an initialization message based on the share information SI. The initialization message may be a first initialization message or a second initialization message. The initialization message may be determined based on the share function information of each storage device, which may indicate whether the associated storage device may share data with another storage device. Furthermore, based on the initialization message received from the host 300, the kind of information to be output from each share-operation-supported storage device may be determined. The kind of information to be output may be either normal status information or extended status information that is information about a current status of the storage device.

In detail, in the case where the device information DI indicates that the storage device 50 supports a share operation with another storage device, the initialization message received from the host 300 may be the first initialization message. Alternatively, in the case where the device information DI indicates that the storage device 50 does not support a share operation with another storage device, the initialization message may be the second initialization message.

Figure 12:
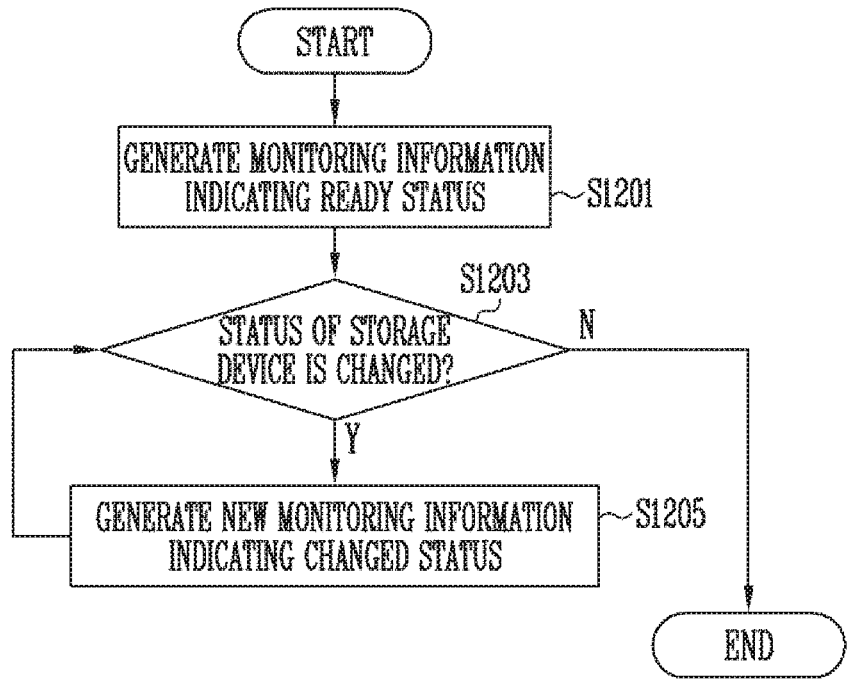
FIG. 12 is a diagram illustrating an operation of the memory controller in accordance with an embodiment of the present disclosure.

FIG. 12 is a diagram illustrating an operation of the memory controller 200 in accordance with an embodiment of the present disclosure.

Referring to FIG. 12, at step S1201, the monitoring information generator 222 included in the monitor 220 in the memory controller 200 may generate monitoring information MNT_INF indicating a ready status of the storage device 50. The monitoring information generator 222 may generate information indicating a ready status and output it to the monitoring controller 221 until the status of the storage device 50 changes.

At step S1203, the monitoring information generator 222 may sense whether there is a change in status of the storage device 50. In detail, the status of the storage device 50 may be changed from the ready status Ready to another status. Alternatively, the status of the storage device 50 may be changed from a non-ready status to the ready status Ready. In the case where there is a change in status of the storage device 50, the process proceeds to step S1205.

At step S1205, the monitoring information generator 222 may generate the new monitoring information MNT_INF indicating the changed status of the storage device 50. In detail, based on the changed status of the storage device 50, the monitoring information MNT_INF may be updated and new (or updated) monitoring information MNT_INF may be generated. The new monitoring information MNT_INF may be provided to the monitoring information storage 320. After the new monitoring information MNT_INF has been generated, the process returns to step S1203.

In detail, the new or updated monitoring information MNT_INF may include information indicating the updated current status of the storage device 50. The monitoring information MNT_INF may be generated based on the initialization message received from the host 300, at the initialization step. In other words, the monitoring information MNT_INF may be generated based on the normal status information and the extended status information that are stored in the status information table 223.

During the initialization operation, in the case where the first initialization message is received from the host 300 and thus the extended status information table 223_1 is set as the status information table 223, the monitoring information MNT_INF indicating ready status (Ready), busy status (Busy), high temperature status (Need to cool down), data back-up required status (Need to back-up data), recovery required status (Need to recovery), or failure analysis data back-up required status (Need to back-up FA data) may be generated.

During the initialization operation, in the case where the second initialization message is received from the host 300 and thus the normal status information table 223_2 is set as the status information table 223, the monitoring information MNT_INF indicating the ready status or the busy status may be generated.

Figure 13:
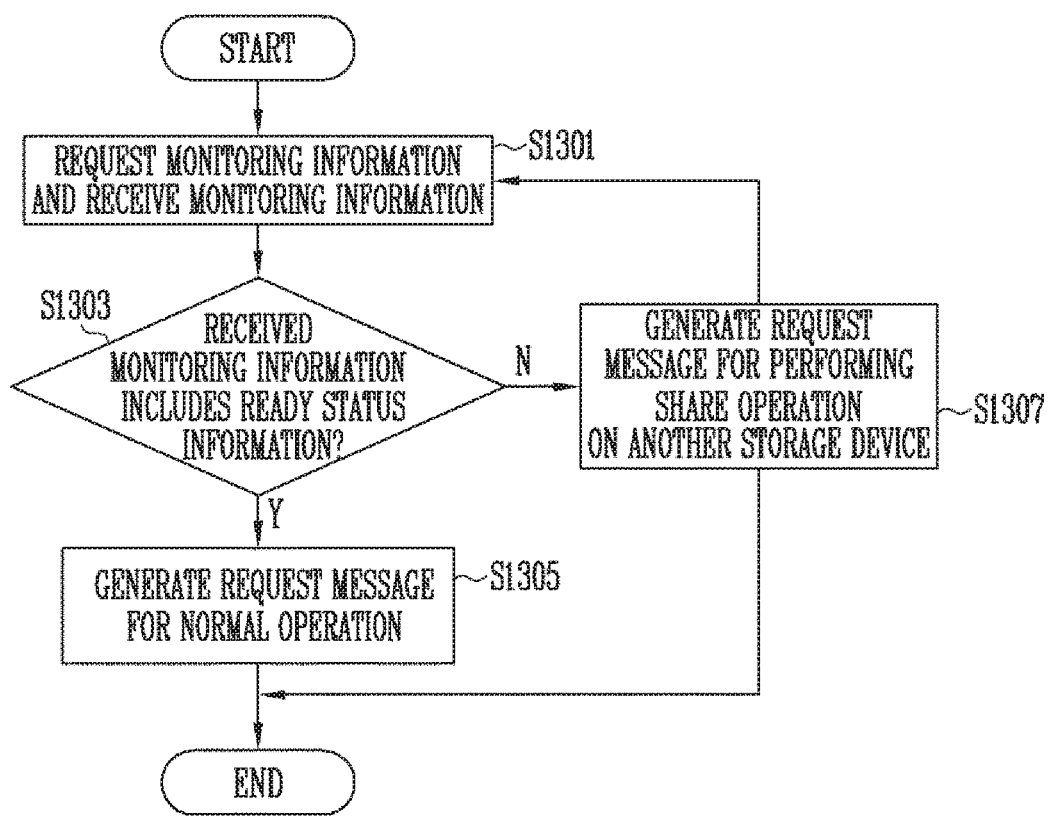
FIG. 13 is a diagram illustrating an operation of the host in accordance with an embodiment of the present disclosure.

FIG. 13 is a diagram illustrating an operation of the host 300 in accordance with an embodiment of the present disclosure.

Referring to FIG. 13, at step S1301, the monitoring information storage 320 included in the host 300 may request and receive monitoring information MNT_INF from each storage device. The monitoring information MNT_INF for storage device 50 may include information about the current status of that storage device. The monitoring information storage 320 may store information about the current status of each of the plurality of storage devices.

In detail, the monitoring information storage 320 may send a monitoring information request MNT_REQ to the monitoring controller 221 on a set cycle. The monitoring information storage 320 may receive monitoring information MNT_INF corresponding to the monitoring information request MNT_REQ from the monitoring controller 221.

At step S1303, it may be determined whether the received monitoring information MNT_INF from each storage device indicates that storage device is in the ready status Ready. The ready status Ready of storage device 50 may represent that such storage device may perform an operation. The storage device 50 that is in the ready status Ready may receive a request message REQ_MSG from the host 300 and perform an operation corresponding to the request message REQ_MSG. In the case where the monitoring information MNT_INF indicates the ready status Ready, the process proceeds to step S1305. In the case where the monitoring information MNT_INF indicates any status except the ready status Ready, the process proceeds to step S1307.

At step S1305, the request message controller 330 may generate a request message REQ_MSG for performing a normal operation. The normal operation may be a program (write) operation, a read operation, or an erase operation which is performed without access to another storage device. In other words, since the monitoring information MNT_INF indicates the ready status Ready, a share operation between storage devices may not be required. Therefore, the request message controller 330 may generate a request message and provide it to a storage device that is in the read status as indicated by the monitoring information MNT_INF stored therein.

At step S1307, the request message controller 330 may generate a request message REQ_MSG for performing a share operation by one of the share-operation-supported storage devices instead of another such storage device.

Figure 14:
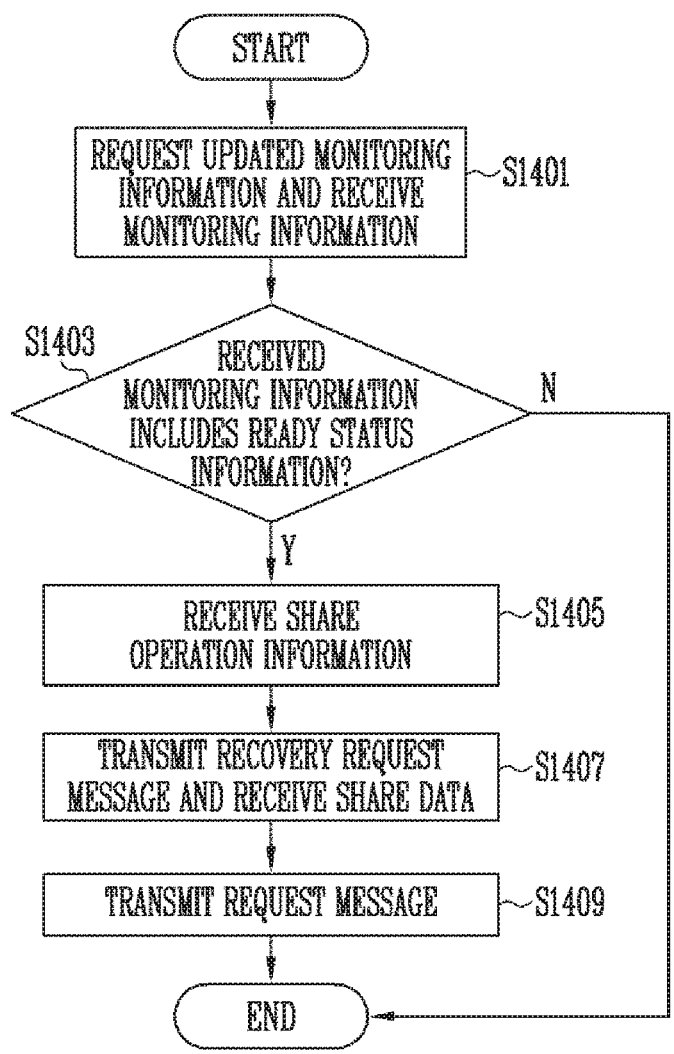
FIG. 14 is a diagram illustrating an operation of the host in accordance with an embodiment of the present disclosure.

FIG. 14 is a diagram illustrating an operation of the host 300 in accordance with an embodiment of the present disclosure.

FIG. 14 is a diagram for describing an operation of the host 300 after each of the share-operation-supported storage devices has provided the monitoring information MNT_INF indicating the status of the storage device to the monitoring information storage 320.

At step S1401, the monitoring information storage 320 included in the host 300 may request updated monitoring information MNT_INF to each storage device. Furthermore, the monitoring information storage 320 may receive the monitoring information MNT_INF from each storage device. In this case, based on the changed status of the storage device 50, the monitoring information MNT_INF may be updated. The updated monitoring information MNT_INF may be provided to the monitoring information storage 320. The updated monitoring information MNT_INF may include information about the changed status of the storage device 50.

At step S1403, it may be determined whether, for each storage device, the received monitoring information MNT_INF indicates the ready status Ready. When the storage device 50 is in the ready status Ready it may perform an operation. The received monitoring information MNT_INF may be information generated as a result of the status of the storage device 50 changing from a non-ready status to the ready status Ready. In the case where the received monitoring information MNT_INF includes information of the ready status Ready, the process proceeds to step S1405.

At step S1405, when the request message controller 330 receives the updated monitoring information MNT_INF, the request message controller 330 may receive the share operation information SHA_INF from the share operation information storage 340 in response to a request of the request message controller 330. The share operation information SHA_INF may be information about an operation to be performed by one of the plurality of share-operation-supported storage devices. The share operation information SHA_INF may include information about a command, an address, and data for the operation to be performed. The share operation information SHA_INF may include information about another storage device on which the operation has been performed.

At step S1407, the request message controller 330 may provide a recovery request message RR_MSG to the storage device, based on share operation information SHA_INF. In the case where an operation to be performed by one of the share-operation-supported storage devices has been performed by another storage device, the recovery request message RR_MSG may be provided to reperform the corresponding operation. In other words, the recovery request message RR_MSG may be for requesting data stored in the storage device on which the operation has been performed.

The request message controller 330 may receive share data SHA_DATA corresponding to the recovery request message RR_MSG. The share data SHA_DATA may be data stored in the storage device on which the operation has been performed. In detail, in the case where the operation to be performed by the storage device is a program operation, the share data SHA_DATA may be stored in the storage device as a result of having already performed the program operation. The share data SHA_DATA may be stored in the share area of the storage device that has performed the program operation.

At step S1409, the request message controller 330 may transmit, to the corresponding storage device, share data SHA_DATA and a request message REQ_MSG for requesting an operation for access between the storage devices. In other words, the request message controller 330 may transmit the share data SHA_DATA and the request message REQ_MSG for reperforming (recovering) the operation on the storage device on which the operation has not been performed. The storage device on which the operation has not been performed may perform the operation based on the request message REQ_MSG and the share data SHA_DATA. The operation which is performed based on the request message REQ_MSG and the share data SHA_DATA may be performed on the user area.

Figure 15:
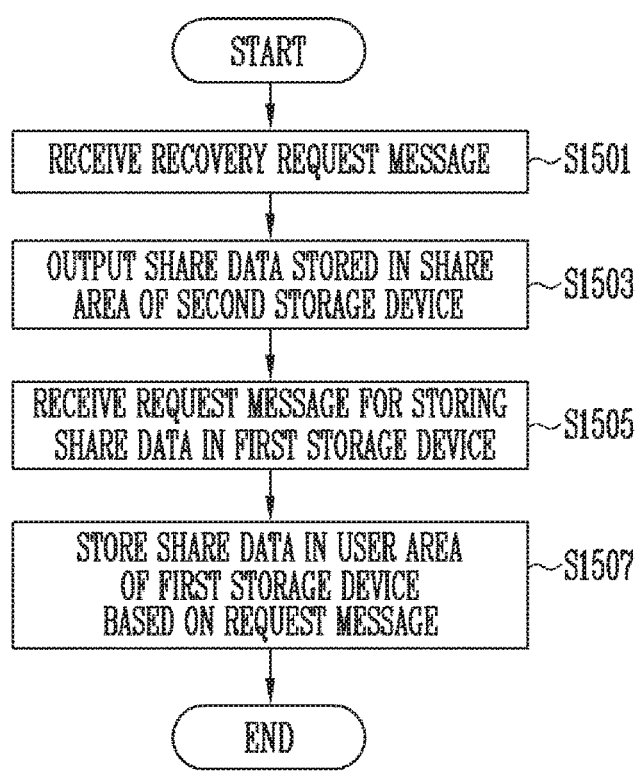
FIG. 15 is a diagram illustrating an operation of the memory controller in accordance with an embodiment of the present disclosure.

FIG. 15 is a diagram illustrating an operation of the memory controller in accordance with an embodiment of the present disclosure.

More specifically, FIG. 15 is a diagram illustrating a recovery operation to be performed in the case in which an operation to be performed by one of a plurality of storage devices, e.g., first storage device SD1, has been performed.

At step S1501, the storage device may receive a recovery request message RR_MSG from the request message controller 330, based on share operation information SHA_INF. The share operation information SHA_INF may be information about an operation to be performed by the first storage device SD1.

At step S1503, if the second storage device SD2 receives a recovery request message RR_MSG from the host 300, share data SHA_DATA stored in the share area of the second storage device SD2 may be output to the host 300. In detail, in the case where the operation to be performed by the first storage device SD1 is a program operation, the share data SHA_DATA may be data stored in the second storage device SD2 as a result of having performed the program operation on the second storage device SD2. The share data SHA_DATA may be stored in the second share area SR2 of the second storage device SD2. Based on the recovery request message RR_MSG of the request message controller 330, the share data SHA_DATA stored in the second share area SR2 of the second storage device SD2 may be output to the request message controller 330.

At step S1505, the first storage device SD1 may receive, from the request message controller 330, a request message REQ_MSG for storing the share data SHA_DATA in the first storage device SD1. In other words, the first storage device SD1 may receive a request message REQ_MSG requesting to perform an operation for access between the storage devices. The request message REQ_MSG may be a message for reperforming (recovering) the operation on the first storage device SD1.

At step S1507, based on the request message REQ_MSG, the share data SHA_DATA may be stored in the user area of the first storage device SD1. The first storage device SD1 may perform the operation based on the request message REQ_MSG and the share data SHA_DATA. The operation that is performed by the first storage device SD1 may be the operation that has been performed by the second storage device SD2.

Figure 16:
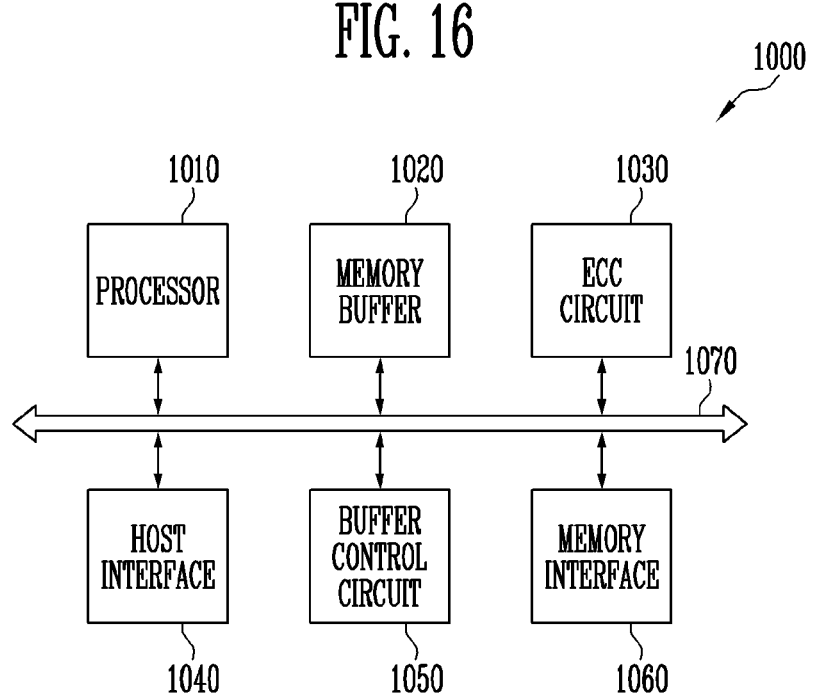
FIG. 16 is a diagram illustrating an embodiment of the memory controller of FIG. 1.

FIG. 16 is a diagram illustrating an embodiment of the memory controller of FIG. 1.

A memory controller 1000 is coupled to a host and a memory device, e.g., to host 300 and memory device 100 of FIG. 1. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

Referring to FIG. 16, a memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device through the memory interface 1060. In addition, the processor 1010 may communicate with the memory buffer 1020 through the buffer control circuit 1050. The processor 1010 may control the operation of the storage device using the memory buffer 1020 as an operating memory, a cache memory, or a buffer memory.

The processor 1010 may perform the function of a flash translation layer (FTL). The processor 1010 may translate a logical address (LA), provided by the host, into a physical address (PA) through the FTL. The FTL may receive the LA and translate the LA into the PA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processing unit 1010. The memory buffer 1020 may store codes and commands to be executed by the processing unit 1010. The memory buffer 1020 may store data to be processed by the processing unit 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component thereof.

The host interface 1040 may communicate with the external host under control of the processor 1010. The host interface 1040 may perform communication using at least one of various communication methods, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other so as not to interfere with, nor affect, each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 17:
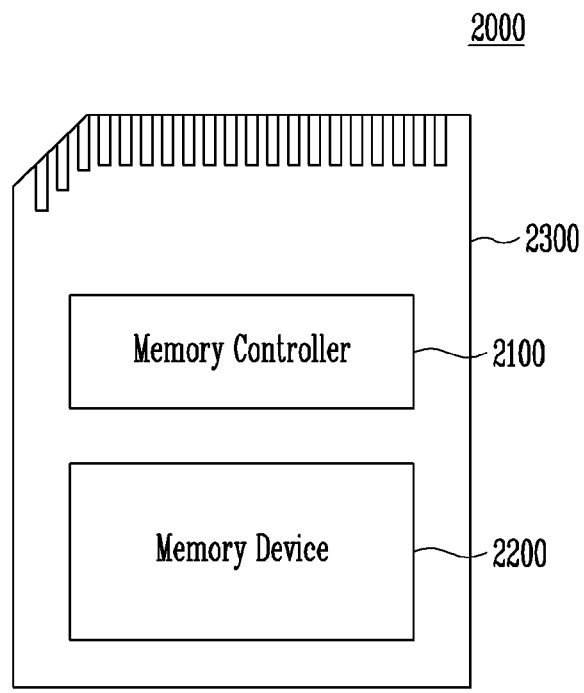
FIG. 17 is a block diagram illustrating a memory card system to which the storage device is applied in accordance with an embodiment of the present disclosure.

FIG. 17 is a block diagram illustrating a memory card system 2000 to which the storage device is applied in accordance with an embodiment of the present disclosure.

Referring FIG. 17, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and the host. The memory controller 2100 may drive firmware for controlling the memory device 2200. The memory device 2200 may be embodied in the same manner as that of the memory device 100 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols, such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card, such as a personal computer memory card international association (PCM-CIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 18:
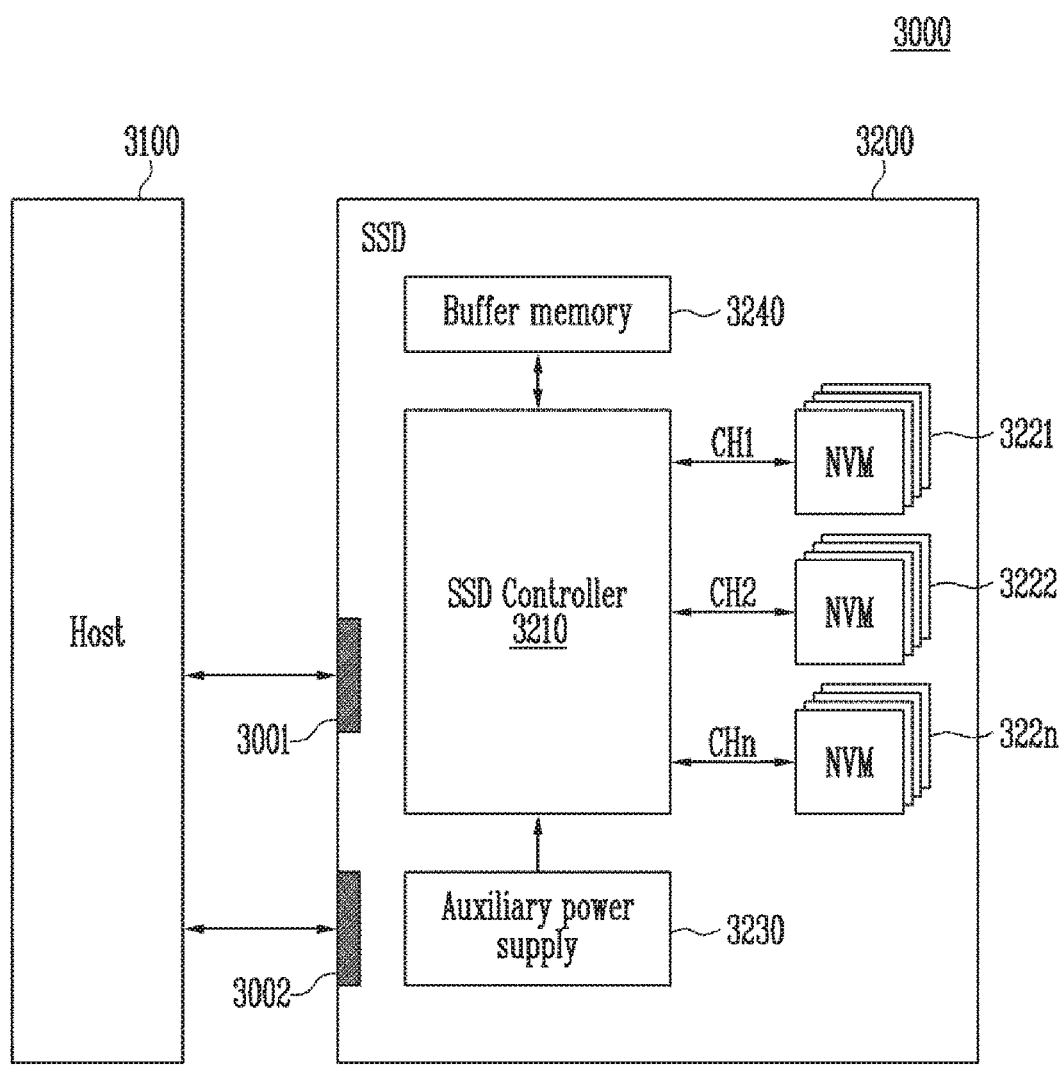
FIG. 18 is a block diagram illustrating a solid state drive (SSD) system to which the storage device is applied in accordance with an embodiment of the present disclosure.

FIG. 18 is a block diagram illustrating a solid state drive (SSD) system 3000 to which the storage device is applied in accordance with an embodiment of the present disclosure.

Referring to FIG. 18, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322$n$ in response to the signals SIG received from the host 3100. In an embodiment, the signals SIG may be based on an interface between the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be disposed within the SSD 3200 or provided as a separate component external to the SSD 3200. For example, the auxiliary power supply 3230 may be disposed in a main board and may supply auxiliary power to the SSD 3200.

The buffer memory 3240 may serve the SSD 3200. For example, the buffer memory 3240 may temporarily store data received from the host 3100 or data received from the plurality of flash memories 3221 to 322n or may temporarily store metadata (e.g., mapping information) of the flash memories 3221 to 322n. The buffer memory 3240 may be implemented by any of various volatile memories such as DRAM, SDRAM, DDR SDRAM, LPDDR SDRAM, and GRAM or nonvolatile memories such as FRAM, ReRAM, STT-MRAM, and PRAM.

Figure 19:
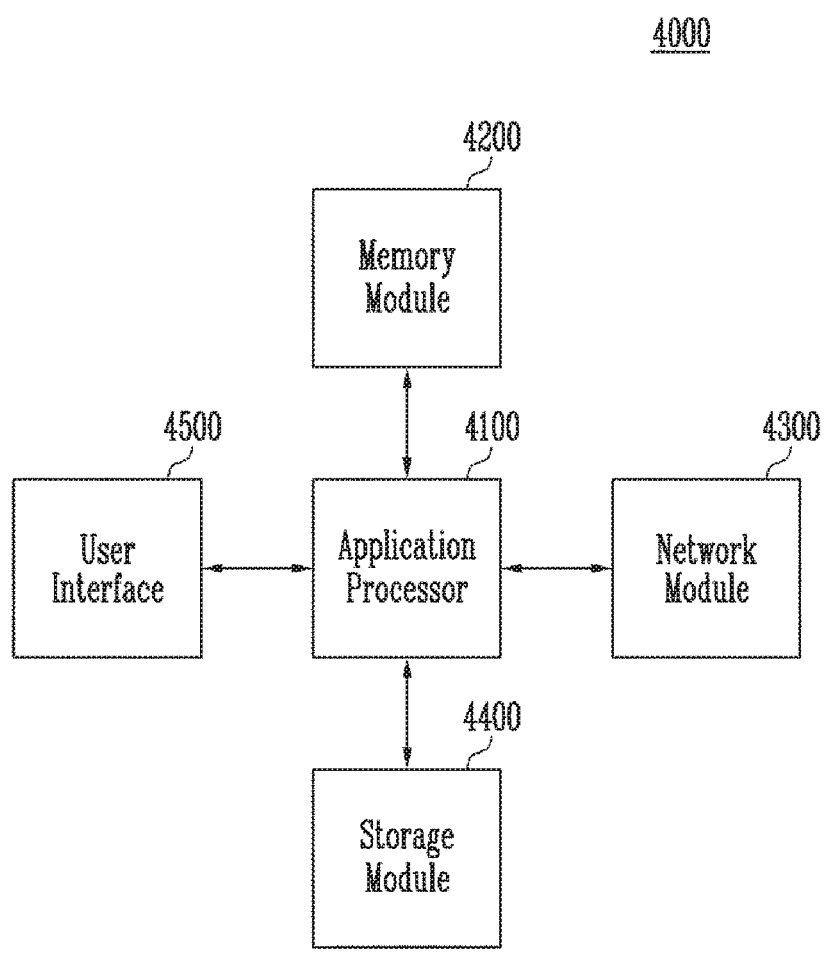
FIG. 19 is a block diagram illustrating a user system to which the storage device is applied in accordance with an embodiment of the present disclosure.

FIG. 19 is a block diagram illustrating a user system 4000 to which the storage device is applied in accordance with an embodiment of the present disclosure.

Referring to FIG. 19, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may be implemented as any of various volatile RAMs such as a DRAM, an SDRAM, a DDR SDRAM, a DDR2 SDRAM, a DDR3 SDRAM, an LPDDR SDARM, and an LPDDR3 SDRAM, or implemented as any of various non-volatile RAMs such as a PRAM, a ReRAM, an MRAM, and an FRAM. In an embodiment, the application processor 4100 and the memory module 4200 may be packaged based on package-on-package (POP) as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (ReRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device described above with reference to FIG. 10. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a motor.

As described above, various embodiments of the present disclosure provide a storage device including a memory device and a memory controller configured to control the memory device such that a share operation may be performed between storage devices, and a method of operating such storage device(s).

Although embodiments of the present disclosure have been disclosed, those skilled in the art will appreciate in light of the present disclosure that various modifications, additions and substitutions are possible, without departing from the scope and spirit of the present disclosure.

Therefore, the scope of the present invention is defined by the appended claims and equivalents thereof, rather than by the description preceding them.

In the above-discussed embodiments, in some cases one or more steps may be selectively performed or skipped. In addition, the steps may not be always performed in regular order. Furthermore, the embodiments disclosed herein aim to help those with ordinary knowledge in this art more clearly understand the present invention, rather than aiming to limit the bounds of the present invention. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

What is claimed is:

1. A storage device comprising:
   a memory device configured to store data; and
   a memory controller configured to control the memory device in response to a request of a host,
   wherein the memory controller comprises:
   a device information storage configured to store device information including share function information indicating whether the storage device is capable of sharing the data with another storage device; and
   a monitor configured to receive from the host an initialization message determining, based on the share function information, a kind of information output from the storage device, and generate any one of normal status information and extended status information indicative of a current status of the storage device, in response to the initialization message.

2. The storage device according to claim 1, wherein the share function information further includes information about whether an operation of receiving a request message and data from the host for the storage device to perform an operation to be performed by the another storage device, and an operation of providing the data to the host for the another storage device to perform an operation to be performed by the storage device are capable of being performed.

3. The storage device according to claim 1, wherein the device information is provided to the host during an initialization operation.

4. The storage device according to claim 3,
   wherein, when the storage device is capable of sharing the data with the another storage device, the initialization message is a first initialization message, and
   wherein, when the storage device is not capable of sharing the data with the another storage device, the initialization message is a second initialization message.

5. The storage device according to claim 4, wherein the extended status information is information generated to indicate any of a ready status, a busy status, a high temperature status, a data back-up required status, a recovery required status, and a failure analysis data back-up required status of the storage device after the first initialization message is received from the host.

6. The storage device according to claim 4, wherein the normal status information is information generated to indicate any of a ready status and a busy status of the storage device after the second initialization message is received from the host.

7. The storage device according to claim 1, wherein the monitor comprises:
   a monitoring information generator configured to generate monitoring information based on the normal status information or the extended status information; and
   a monitoring controller configured to store the monitoring information received from the monitoring information generator, and output the stored monitoring information to the host in response to a monitoring information request of the host.

8. The storage device according to claim 7, wherein the normal status information or the extended status information indicates the ready status until there is a change in status of the storage device.

9. The storage device according to claim 7, wherein, when the status of the storage device changes, the monitoring information generator generates updated monitoring information based on changed normal status information or extended status information.

10. The storage device according to claim 7, wherein the monitor outputs the monitoring information, in response to a monitoring information request output from the host on a preset cycle.

11. The storage device according to claim 5, wherein, when the extended status information indicates a non-ready status of the storage device, the request message and data corresponding to the request message from the host is provided to the another storage device.

12. The storage device according to claim 11, wherein, when the extended status information of the storage device is changed from a non-ready status to the ready status, the request message and data corresponding to the request message from the host is provided to the storage device.

13. The storage device according to claim 1, wherein the memory device includes a share area on which an operation of sharing the data is performed by the storage device and the another storage device.

14. A host device comprising:
   a share information storage configured to receive and store device information from each of a plurality of storage devices indicating whether the corresponding storage device is able to perform a share operation of sharing data with at least one other of the plurality of storage devices;
   a monitoring information storage configured to receive and store monitoring information indicative of a current status of each of the plurality of storage devices; and
   a request message controller configured to generate and output a request message for performing a normal operation or the share operation of at least two of the plurality of storage devices, based on the device information received from the plurality of storage devices.

15. The host device according to claim 14, further comprising:
   a share operation information storage,
   wherein, when an operation to be performed by one of the plurality of storage devices is performed by another of the plurality of storage devices in response to the request message, the share operation information storage stores information of the performed operation and information of the storage device which has performed the operation.

16. A data processing system comprising:
   a plurality of storage devices each configured to store share function information; and
   a host configured to:
     select, based on the share function information, first and second cooperative storage devices among the storage devices;
     control, when the first cooperative storage device is in a non-ready status, the second cooperative storage device in the ready status to perform a sharable operation, which the first cooperative storage device is supposed to perform; and
     control, when the first cooperative storage device is in the ready status, the second cooperative storage device to provide the first cooperative storage device with a result of the sharable operation performed by the second cooperative storage device,
   wherein the share function information indicates whether or not a corresponding storage device is capable of performing the sharable operation on behalf of a cooperative storage device.

* * * * *